(12) United States Patent
Vintola et al.

(10) Patent No.: US 11,805,493 B2
(45) Date of Patent: Oct. 31, 2023

(54) COMPRESSED DC LOCATION REPORTING SCHEME FOR UL CA

(71) Applicant: QUALCOMM Incorporated, San Diego, CA (US)

(72) Inventors: Timo Ville Vintola, San Diego, CA (US); Peter Gaal, San Diego, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 17/497,896

(22) Filed: Oct. 9, 2021

(65) Prior Publication Data

US 2022/0124666 A1 Apr. 21, 2022

Related U.S. Application Data

(60) Provisional application No. 63/093,200, filed on Oct. 17, 2020.

(51) Int. Cl.
| | |
|---|---|
| *H04W 64/00* | (2009.01) |
| *H04L 5/00* | (2006.01) |
| *H04W 4/029* | (2018.01) |

(52) U.S. Cl.
CPC ........... *H04W 64/003* (2013.01); *H04L 5/001* (2013.01); *H04L 5/0098* (2013.01); *H04W 4/029* (2018.02)

(58) Field of Classification Search
CPC ..... H04W 64/003; H04L 5/001; H04L 5/0098
See application file for complete search history.

(56) References Cited

U.S. PATENT DOCUMENTS

2019/0261425 A1* 8/2019 Park ...................... H04W 76/27

* cited by examiner

*Primary Examiner* — Curtis B Odom
(74) *Attorney, Agent, or Firm* — The Marbury Law Group/Qualcomm Incorporated

(57) ABSTRACT

Aspects include systems and methods for compressed direct current (DC) location reporting, such as DC location reporting in uplink (UL) carrier aggregation (CA) deployments in a wireless network. Various aspects may include a UE computing device determining and indicating DC locations only for a subset of a plurality of component carriers (CCs) in a channel bandwidth to a base station and/or a UE computing device determining and indicating DC locations for a subset of activation permutations for bandwidth parts (BWPs) of a plurality of CCs in a channel bandwidth that is less than all possible activation permutations of the BWPs of the plurality of CCs in the channel bandwidth.

29 Claims, 17 Drawing Sheets

COMPRESSED DC LOCATION REPORTING SCHEME FOR UL CA

RELATED APPLICATIONS

This application claims the benefit of priority to U.S. Provisional Application No. 63/093,200 entitled "Compressed DC Location Reporting Scheme For UL CA" filed Oct. 17, 2020, the entire contents of which are hereby incorporated herein by reference for all purposes.

BACKGROUND

Long Term Evolution (LTE), Fifth Generation (5G) new radio (NR)(5GNR), and other recently developed communication technologies allow wireless devices to communicate information at data rates (e.g., in terms of Gigabits per second, etc.) that are orders of magnitude greater than what was available just a few years ago. Today's communication systems are also more secure, resilient to multipath fading, allow for lower network traffic latencies, and provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

Communication systems may be configured to employ carrier aggregation (CA) to provide sufficient bandwidth to support high data rate communications. A CA system combines bandwidth from distinct frequency bands, each referred to as a component carrier (CC). Each CC may be scheduled differently. For example, component carriers for downlink control information, downlink data, uplink control information, and uplink data may each be scheduled independently, referred to as cross-carrier scheduling.

SUMMARY

Various aspects include systems and method for compressed direct current (DC) location reporting, such as DC location reporting in uplink (UL) carrier aggregation (CA) deployments. Various aspects include methods for DC location reporting performed by a processor of a User Equipment (UE) computing device and/or a base station in a wireless network. Various aspects may include receiving an indication of a configuration of a plurality of component carriers (CCs) in a channel bandwidth from a base station of the wireless network, wherein each of the plurality of CCs includes one or more bandwidth parts (BWPs), receiving an indication of a subset of activation permutations for the BWPs of the plurality of CCs in the channel bandwidth from the base station, wherein the subset of activation permutations may be less than all possible activation permutations of the BWPs of the plurality of CCs in the channel bandwidth, determining one or more DC locations for the subset of activation permutations for the BWPs of the plurality of CCs in the channel bandwidth, and sending an indication of the one or more DC locations to the base station.

In some aspects, the indication of the subset of activation permutations for the BWPs of the plurality of CCs in the channel bandwidth may be a list of permutations of BWPs for each CC of the plurality of CCs in the channel bandwidth that will be activated together. In some aspects, the indication of the subset of activation permutations for the BWPs of the plurality of CCs in the channel bandwidth may be a list of permutations of BWPs for each CC of the plurality of CCs in the channel bandwidth in an order of probability of actual activation. In some aspects, the indication of the subset of activation permutations for the BWPs of the plurality of CCs in the channel bandwidth may be a list of permutations of BWPs for each CC of the plurality of CCs in the channel bandwidth in an order of preference for activation by the wireless network.

Some aspects may further include determining a subset of the plurality of CCs in the channel bandwidth in which one or more DC locations will be located, wherein the subset of the plurality of CCs in the channel bandwidth may be less than all of the plurality of CCs in the channel bandwidth, and sending an indication of the subset of the plurality of CCs in the channel bandwidth to the base station, wherein determining the one or more DC locations for the subset of activation permutations for the BWPs of the plurality of CCs in the channel bandwidth includes determining the one or more DC locations in only the subset of the plurality of CCs in the channel bandwidth for the subset of activation permutations for the BWPs of the plurality of CCs in the channel bandwidth.

Some aspects may further include determining whether only edge CCs of the plurality of CCs in the channel bandwidth will impact DC location, and sending an indication to the base station that only edge CCs will impact DC location in response to determining that only edge CCs of the plurality of CCs in the channel bandwidth will impact DC location, wherein the subset of activation permutations may be less than all possible activation permutations of the BWPs of the plurality of CCs in the channel bandwidth and the subset of activation permutations may be activation permutations of the BWPs of the edge CCs of the plurality of CCs in the channel bandwidth.

In some aspects, the plurality of CCs in the channel bandwidth may be 2 to 16 CCs. In some aspects, the indication of the one or more DC locations may be sent in a radio resource control (RRC) message, a medium access control (MAC) control element (MAC-CE) message, or in uplink control information. Some aspects may further include sending an indication to the base station that the UE computing device supports compressed DC location reporting. In some aspects, the plurality of CCs in the channel bandwidth may be a plurality of UL CCs.

Further aspects include a wireless device having a processor configured with processor-executable instructions to perform operations of any of the methods summarized above. Further aspects include a processor configured for use in a wireless device and configured with processor-executable instructions to perform operations of any of the methods summarized above. Further aspects include a wireless device having means for performing functions of any of the methods summarized above. Further aspects include a non-transitory processor-readable storage medium having stored thereon processor-executable instructions configured to cause a wireless device processor to perform operations of any of the methods summarized above.

Further aspects may include a network computing device having a processor configured to perform one or more operations of any of the methods summarized above. Further aspects may include a non-transitory processor-readable storage medium having stored thereon processor-executable instructions configured to cause a processor of a network computing device to perform operations of any of the methods summarized above. Further aspects include a network computing device having means for performing functions of any of the methods summarized above. Further aspects include a system-on-chip for use in a network computing device that includes a processor configured to perform one or more operations of any of the methods summarized above. Further aspects include a system in a package that includes two systems on chip for use in a network computing device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments and aspects of the claims, and together with the general description given above and the detailed description given below, serve to explain the features of the claims.

DETAILED DESCRIPTION

Figure 1:
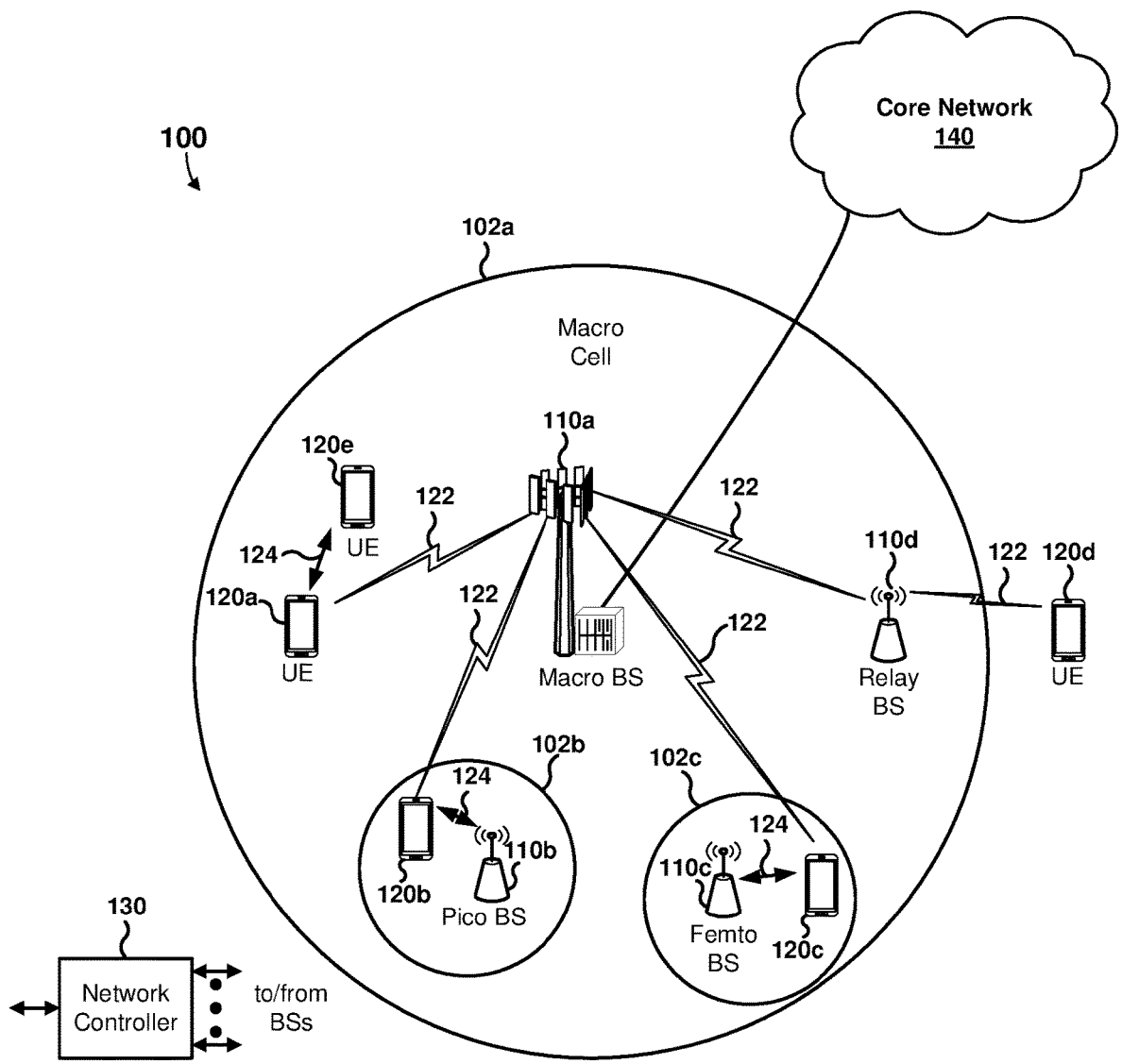
FIG. 1 is a system block diagram illustrating an example communication system suitable for implementing any of the various aspects.

Various aspects will be described in detail with reference to the accompanying drawings. Wherever possible, the same reference numbers will be used throughout the drawings to refer to the same or like parts. References made to particular examples and aspects are for illustrative purposes, and are not intended to limit the scope of the claims.

Various aspects include systems and methods for compressed direct current (DC) location reporting, such as DC location reporting in uplink (UL) carrier aggregation (CA) deployments. Various aspects include a UE computing device determining and indicating DC locations only for a subset of a plurality of component carriers (CCs) in a channel bandwidth to a base station and/or a UE computing device determining and indicating DC locations for a subset of activation permutations for bandwidth parts (BWPs) of a plurality of CCs in a channel bandwidth that is less than all possible activation permutations of the BWPs of the plurality of CCs in the channel bandwidth. In various aspects, the subset of activation permutations for BWPs of a plurality of CCs in a channel bandwidth may be indicated by a base station to a UE computing device and/or may be based on a UE computing device indicating to the base station that only edge CCs of the plurality of CCs in the channel bandwidth will impact DC location. By determining and indicating DC locations only for a subset of a plurality of CCs in a channel bandwidth to a base station and/or by determining and indicating DC locations for a subset of activation permutations for BWPs of a plurality of CCs in a channel bandwidth, various aspects may enable a UE computing device to compute less DC locations than are computed in conventional CA deployments and/or to send smaller size (e.g., smaller bit size) DC location reporting messages to a base station than are sent in conventional CA deployments. The computation of less DC locations according to various aspects may save processing resources and/or power on a UE computing device compared to UE computing devices in conventional CA deployments. The sending of smaller size (e.g., smaller bit size) DC location reporting messages by a UE computing device to a base station according to various aspects may conserve radio resource a UE computing device, increase transmission rates by a UE computing device, save power on a UE computing device, and/or reduce network signaling overhead compared to conventional CA deployments.

The terms "wireless device" and "user equipment (UE) computing device" are used interchangeably herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "radio resource" is used herein to refer to hardware, such as modems, radios, processors, transceivers, transmitters, receivers, timers, voltage regulators, oscillators, amplifiers, filters, antennas, circuits, encoders, decoders, etc., and/or software that operate individually, or in any combination, for sending and/or receiving electromagnetic radiation to provide wireless communication services, such as cellular and mobile communication services.

The various aspects are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

LTE is a mobile network standard for 4G wireless communication of high-speed data developed by the 3GPP (3rd Generation Partnership Project) and specified in its Release 8 document series. The 5G system is an advanced technology from 4G LTE, and provides a new radio access technology (RAT) through the evolution of the existing mobile communication network structure. Implementations for 5G systems or networks are currently being adopted that provide new radio (NR) (also referred to a 5G) support via NR base stations, such as Next Generation NodeB (gNodeBs or gNBs)). The 5G systems and NR base stations are providing flexibility in bandwidth scheduling and utilization. Future generation systems (e.g., sixth generation (6G) or higher systems) may provide the same or similar flexibility in bandwidth scheduling and utilization.

In some wireless networks, UE computing devices may be configured to use less than the full operating bandwidth of a cell. As an example, a bandwidth part (BWP) may be configured as a narrower frequency band having a narrower bandwidth than the full bandwidth of the cell (also referred to as the carrier bandwidth of the cell). Multiple different BWPs may be configured for a cell such that different sub-portions of the overall carrier bandwidth of a cell may be associated with different BWPs having their own respective bandwidths. A UE computing device may communicate (e.g., transmit and/or receive) with the cell in one or more BWPs assigned to the UE computing device, also referred to as a one or more active BWPs for the UE computing device.

Wireless networks may be configured to employ carrier aggregation (CA) to provide sufficient bandwidth to support high data rate communications. A 5G network, for example, may combine bandwidth from distinct frequency bands, each referred to as a component carrier (CC). Each CC may be configured with one or more BWPs, such as 1, 2, 3, or 4 BWPs. CCs for downlink (DL) control information, DL data, uplink (UL) control information, and UL data may each be scheduled independently. The frequency range spanned by the one or more configured CCs may be referred to as a channel bandwidth and the channel bandwidth may be greater than the frequency band of any individual CC in CA.

In some wireless networks, the subcarrier at the center frequency of a resource block may be unused to avoid possible leakage interference from the local oscillator in a transmitter. The local oscillator may be typically tuned to the center frequency. The subcarrier at the center frequency may be referred to as the direct current (DC) subcarrier or DC location. For example, UE computing devices in 5G networks may be configured to report the location of a DC subcarrier (or the DC location) to a base station (e.g., gNB) or other terminal equipment (TE). The reporting of the DC location by the UE computing device may enable cancellation by the base station (e.g., gNB) or other TE.

In some wireless networks, the UL DC location may be reported by a UE computing device for each configured BWP. For a single CC configuration, in 5G networks, the parameter txDirectCurrentLocation in UplinkTxDirectCurrentList information element may be reported using the RRCReconfigurationComplete message to indicate the DC location to the base station. The DC location may be in any subcarrier in the CC or outside or the CC. The DC can reside anywhere in the 3,300 subcarriers of the CC. When reporting the DC location, values 0-3,299 are used to represent the DC subcarrier of the DC location, the value 3,300 indicates that the DC subcarrier is located outside the resource grid, and the value 3,301 indicates that the position of the DC subcarrier in the uplink is undetermined. As such, 12 bits are needed for reporting each BWP. As up to four BWPs may be configured for each CC, 48 bits (e.g., 4×12 bits) may be needed for one CC.

In CA, the DC location may depend on the activated BWPs and the configured CCs. With multiple CCs configured and multiple BWPs for each CC, there may be numerous possible permutations of activated BWPs and many possibilities of DC location. For example, there may be 2 to 16 CCs each having one or more BWPs leading to numerous possible permutations of activated BWPs and many possibilities of DC location. As DC location depends on the specific UE computing device's configuration, the permutations per UE computing device in wireless networks, for example 5G networks, may result in a high number of bits to be transported for DC location signaling. For example, in a scenario in which 4 CCs are configured for a channel bandwidth, 256 possible permutations of activated BWPs may be needed to accounted for and the DC location for each permutation signaled by a UE computing device. As another example, in a scenario in which 8 CCs are configured for a channel bandwidth, 65,536 possible permutations of activated BWPs may be needed to accounted for and the DC location for each permutation signaled by a UE computing device. As there may be four different BWPs in each CC and the DC location can be identified with 3,301 different values, one BWP may need 14 bits for reporting. Reporting each of BWP for each permutation within a channel bandwidth may result in a high number of bits to be transported.

Various aspects may enable a UE computing device to report DC locations for less than all possible permutations of activated BWPs for the configured CCs in a channel bandwidth. Various aspects may enable compression of the reporting of DC locations such that less than all possible permutations of activated BWPs for the configured CCs in a channel bandwidth may be used by a UE computing device to determine DC locations and/or to report DC locations. In various aspects, impractical combinations of BWPs for the configured CCs in the channel bandwidth may be excluded from DC location reporting. In some aspects, a network may inform a UE computing device of combinations of possible activated BWPs and DC locations associated with only the network indicated possible activated BWPs may be reported by a UE computing device. In some aspects, a UE computing device may indicate a capability to provide compressed DC location reporting, such as DC location reporting for less than all possible permutations of activated BWPs for the configured CCs in a channel bandwidth, to a base station. Various aspects may include a UE computing device encoding DC location reporting information to reduce or eliminate redundancy in DC location reporting, a network informing a UE computing device of combinations of configured BWPs to be activated together, and/or a UE computing device indicating to a network that only edge CCs may impact the DC location.

In various aspects, in response to CA being configured, such as UL CA being configured, a UE computing device may report the DC location only once per CC. In various aspects, the single reporting of the DC location per CC may cover all configured BWPs for each CC. The reporting of the DC location once per CC may replace reporting of DC location per configured BWP. In various aspects, a UE computing device may report the DC location only once per CC as a function of the permutations of the BWPs. For example, in a scenario in which two CCs are configured for a channel bandwidth, for each BWP permutation (e.g., 16 for 2 CCs at 4 BWP's each), there would be a 12+12 bit indication of the DC location. As another example, in a scenario in which a UE computing device may support a two power amplifier (2PA) architecture, there may be two DC locations for each BWP permutation.

In various aspects, a UE computing device may indicate to a base station (e.g., a gNB) one or more CCs that include a DC location. In various aspects, a UE computing device may determine a CC which has the DC location for an activated BWP permutation and report the DC location for only that CC. The indication may be a multi-bit indication of the CC (e.g., a 3-bit indication when 8 UL CCs are configured). The CC containing the DC location indication may be reported as a function of all possible activated BWP permutations. As an example, a UE computing device may determine that while four CCs are configured, such as CC1, CC2, CC3, and CC4, the DC location for the UE computing device may always be in two of the CCs, such as CC2 and CC3. In such an example, the UE computing device may indicate to the base station (e.g., the gNB), the DC location will always be in CC2 or CC3 and the UE computing device may not report DC locations for CC1 and CC4.

In various aspects, a base station (e.g., a gNB) may limit a number of BWP permutations to be considered by a UE computing device for the CCs configured in a channel bandwidth. A base station (e.g., a gNB) may indicate the BWP permutations that will be activated across the configured CCs for the channel bandwidth to a UE computing device. For example, the base station may send a bitmap of the BWP permutations that will be activated across the configured CCs for the channel bandwidth. In some aspects, the indication may be an indication of specific BWP permutations. In some aspects, the indication may be an indication of schemes (or relationships) for BWP activation across CCs (e.g., when a BWP in a selected CC is activated, only a specific BWP in another CC may be activated). In some aspects, the indication may be a list of permutations of BWPs for each CC of the plurality of CCs in the channel bandwidth in an order of probability of actual activation. In some aspects, the indication may be a list of permutations of BWPs for each CC of the plurality of CCs in the channel bandwidth in an order of preference for activation by the wireless network, for example a 5G NR network. The UE computing device may determine DC locations only for the indicated BWP permutations that will be activated across the configured CCs for the channel bandwidth. The UE computing device may report only DC locations for the indicated BWP permutations that will be activated across the configured CCs for the channel bandwidth. As an example, with eight CCs and 4 BWPs per CC, a base station (e.g., a gNB) may send a 16-bit (e.g., 8×2) bitmap for each BWP permutation that will be activated by the base station (e.g., the gNB). The UE computing device may respond with a list in the order of the BWP permutations without including the bitmaps. As an example, a base station (e.g., a gNB) may indicate to a UE computing device that for a channel bandwidth having four CCs, CC1, CC2, CC3, and CC4, whenever CC1 and CC4 are activated, the BWPs in CC2 and CC3 are always full channel BWPs (e.g., BWP 1 for the CC2 and CC3, respectively). In this manner, the UE computing device may only determine and report DC locations based on CC1 and CC4 BWPs.

In various aspects, a UE computing device may indicate to a base station (e.g., a gNB) that for a series of configured CCs in the channel bandwidth, only the edge CC BWPs will impact the DC location for the UE computing device. For example, when an activated BWP changes in a CC that is between two other CC's, the change in the activated BWP may not impact the DC location. In contrast, when the activated BWP in an edge CC changes, that change in active BWP may impact the DC location. In various aspects in which the UE computing device may indicate to a base station (e.g., a gNB) that for a series of configured CCs in the channel bandwidth, only the edge CC BWPs will impact the DC location for the UE computing device, the base station may inform the UE computing device of only the edge most CC BWP permutations to be activated in the channel bandwidth and may request the UE computing device indicate DC locations based only those edge most CC BWP permutations.

In various aspects, a base station (e.g., a gNB) may send an indication to a UE computing device that while all CCs in the channel bandwidth may be configured with multiple BWPs, certain one or more CCs may always be configured with specific BWPs (e.g., their largest respective BWP) when BWPs in an adjacent CC are activated. In various aspects, in addition or in place of the indication that certain one or more CCs may always be configured with specific BWPs, the base station (e.g., the gNB) may send two lists to the UE computing device that each contain simultaneously activated BWPs for the CCs. In this manner, for a 4 CC configuration, the possible permutations may drop from 256 BWP permutations to 2 BWP permutations. In various aspects, in response to receiving the indication that certain one or more CCs may always be configured with specific BWPs and/or receiving the two list containing simultaneously activated BWPs for the CCs, the UE computing device may send to the base station (e.g., the gNB), an indication of the CCs that contain the DC location and an indication of the DC location the CCs.

As an example, a base station (e.g., a gNB) may configure BWPs for each CC in a channel bandwidth and indicate the configuration of the BWPs and CCs to a UE computing device. The configuration information set from the base station (e.g., the gNB) to the UE computing device may include a list of BWPs that are to be activated simultaneously. The list may include permutation identifiers (IDs) of eight bits. The permutation IDs may be associated with lists of BWPs for each CC, such as 8×2 bits per list. Each permutation ID may be unique and associated with its own respective BWP list. The UE computing device may respond with a RRC configuration complete message with the structure DC location where the list structure corresponds to each permutation ID associated with the CC with DC identification for that permutation, and the DC location for that permutation. In this manner, each permutation ID (e.g., permutation ID1, permutation ID2, etc.) may be associated with its own respective CC containing the DC for that permutation and its own respective DC location for that permutation. For example, the CC may be a 3-bit indication and the DC location may be an 8-bit indication. In scenarios in which the UE computing device has declared it supports a 2PA architecture, a second CC and a second DC location indication may be associated with each permutation ID. The permutation ID itself may be optional when the UE computing device responds with a RRC configuration.

In various aspects, a UE computing device may be configured to declare a DC location per CC. In some embodiments, the DC location may be reported as a function of the activated BWP. In some aspects, the DC location may be reported regardless of the activated BWP. In some aspects, a UE computing device may determine a DC location per CC for a plurality of CCs in a channel bandwidth. The UE computing device may send an indication of the DC location per CC to the base station. In this manner, a DC location may be reported by the UE computing device for each CC configured by the base station regardless of the activated BWP.

In various aspects, a UE computing device may report the DC location in a subset of the CCs and may report the DC location only for those CCs as a function of the BWP activation permutations for the UE computing device. In various aspects, a UE computing device may report the DC location in a subset of the CCs and may report the DC location only for those CCs regardless of the BWP activation permutations for the UE computing device. In some aspects, a UE computing device may be configured to determine the CCs of the plurality of CCs configured by a base station that may include DC locations as a function of the BWP configuration or activations. For example, based on the CC arrangement, the BWP activation, and the configuration of the UE computing device, the UE computing device may determine that DC locations will not fall in certain ones of the CCs (e.g., edge CCs, etc.), that all CCs will include DC locations, that only a single CC will include DC locations, etc. In some aspects, a UE computing device may be configured to determine the CCs of the plurality of CCs configured by a base station that may include DC locations regardless of BWP configuration or activations. For example, based on the CC arrangement and the configuration of the UE computing device, the UE computing device may determine that DC locations will not fall in certain ones of the CCs (e.g., edge CCs, etc.), that all CCs will include DC locations, that only a single CC will include DC locations, etc. In this manner, the UE computing device may determine CCs having DC locations without BWP activation information from a base station. In some aspects, the UE computing device may be configured to determine one or more actual DC locations in the channel bandwidth for only the CCs in the channel bandwidth in which one or more DC locations may be located. In this manner, CCs that are not likely to include DC locations, may be skipped (or disregarded) by the UE computing in determining actual DC locations. Additionally, the actual DC locations may be determined for just the CCs that are likely to include DC locations without regard to the BWP activation in those CCs. Alternatively, the actual DC locations may be determined for just the CCs that are likely to include DC locations as a function of the BWP activation in those CCs. In some aspects, the UE computing device may send an indication of the one or more actual DC locations to the base station.

FIG. 1 illustrates an example of a communications system 100 that is suitable for implementing various aspects. The communications system 100 may be a 5G New Radio (NR) network, or any other suitable network such as an LTE network, 5G network, etc. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140, supporting one or more wireless networks 102a, and a variety of mobile devices (illustrated as wireless devices 120a-120e). The communications system 100 also may include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a wireless device that can relay transmissions for other mobile devices. In the example illustrated in FIG. 1, a relay station 110d may communicate with the macro base station 110a and the wireless device 120d in order to facilitate communication between the macro base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts), whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The mobile devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the core network 140 over a wired or wireless communication link. The wireless devices 120a, 120b, 120c may communicate with a base station 110a-110d over a wireless communication links 122.

Wired communication links may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

Wireless communication links may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communications system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may depend on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some aspects may use terminology and examples associated with LTE technologies, some aspects may be applicable to other wireless communications systems, such as a new radio (NR), a 5G network, a 6G network, etc. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to two streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. Wireless devices 120a-120e may be included inside a housing that houses components of the devices, such as processor components, memory components, similar components, or a combination thereof.

In general, any number of communications systems and any number of wireless networks may be deployed in a given geographic area. Each communications system and wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. In some examples, a wireless device may function as a scheduling entity, scheduling resources for one or more subordinate entities (for example, one or more other mobile devices). In this example, the wireless device is functioning as a scheduling entity, and other mobile devices utilize resources scheduled by the wireless device for wireless communication. A wireless device may function as a scheduling entity in a peer-to-peer (P2P) network, in a mesh network, or another type of network. In a mesh network example, mobile devices may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more mobile devices (for example, illustrated as the wireless device 120a and the wireless device 120e) may communicate directly using one or more sidelink channels (for example, without using a base station 110a as an intermediary to communicate with one another). For example, the mobile devices 120a, 120e may communicate using peer-to-peer (P2P) communications 124, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a may perform scheduling operations, resource selection operations, as well as other operations described elsewhere herein as being performed by the base station 110d.

Some aspects may be implemented on a number of single processor and multiprocessor computer systems, including a system-on-chip (SOC) or system in a package (SIP).

Figure 2:
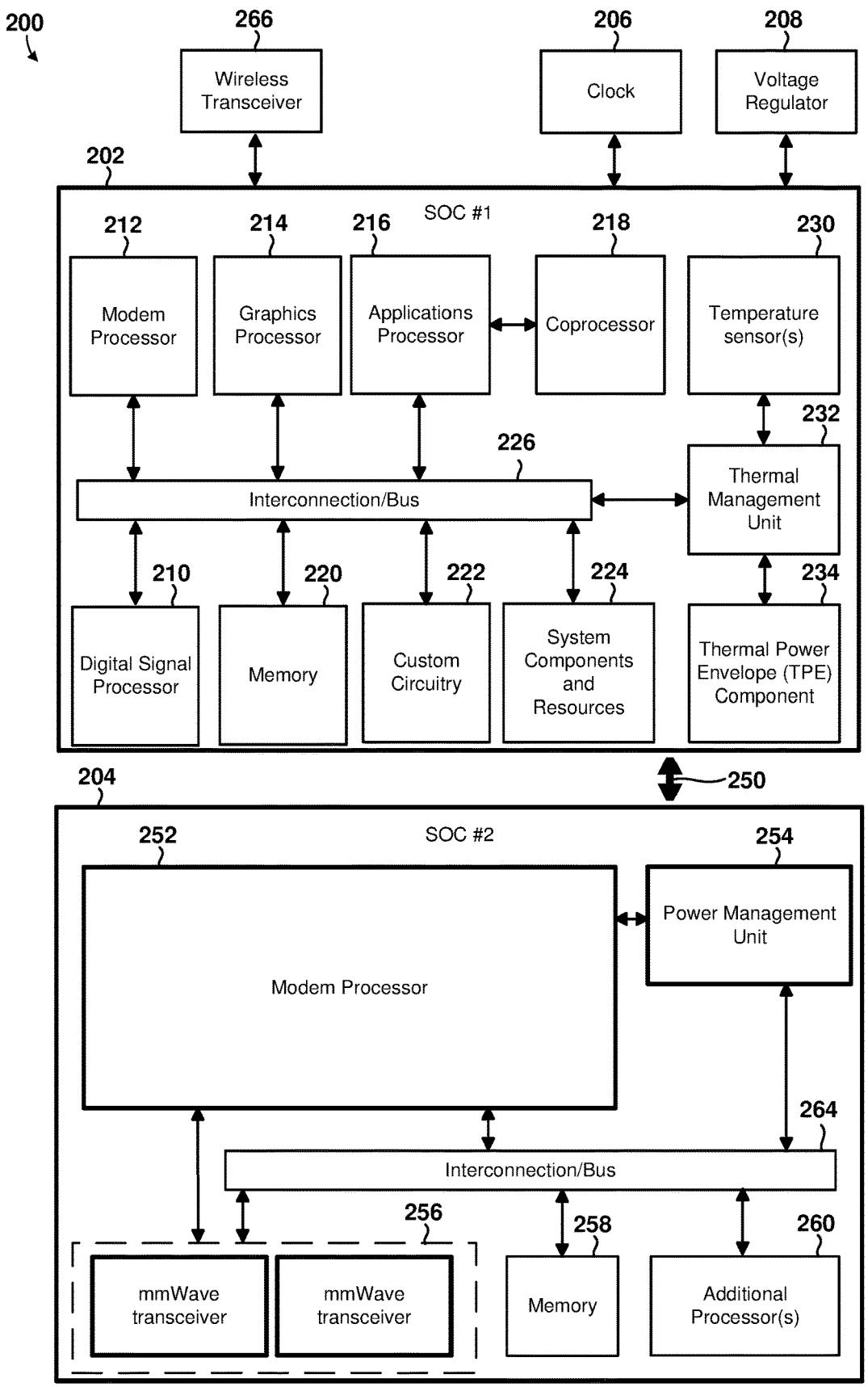
FIG. 2 is a component block diagram illustrating an example computing and wireless modem system suitable for implementing any of the various aspects.

FIG. 2 is a component block diagram illustrating an example computing and wireless modem system 200 suitable for implementing any of the various aspects. Various aspects may be implemented on a number of single processor and multiprocessor computer systems, including a system-on-chip (SOC) or system in a package (SIP).

With reference to FIGS. 1 and 2, the illustrated example wireless device 200 (which may be a SIP in some aspects) includes a two SOCs 202, 204 coupled to a clock 206, a voltage regulator 208, and a wireless transceiver 266 configured to send and receive wireless communications via an antenna (not shown) to/from network wireless devices, such as a base station 110a. In some aspects, the first SOC 202 operate as central processing unit (CPU) of the wireless device that carries out the instructions of software application programs by performing the arithmetic, logical, control and input/output (I/O) operations specified by the instructions. In some aspects, the second SOC 204 may operate as a specialized processing unit. For example, the second SOC 204 may operate as a specialized 5G processing unit responsible for managing high volume, high speed (e.g., 5 Gbps, etc.), or very high frequency short wavelength (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (e.g., CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, some aspects may be implemented in a wide variety of computing systems, which may include a single processor, multiple processors, multicore processors, or any combination thereof.

Figure 3:
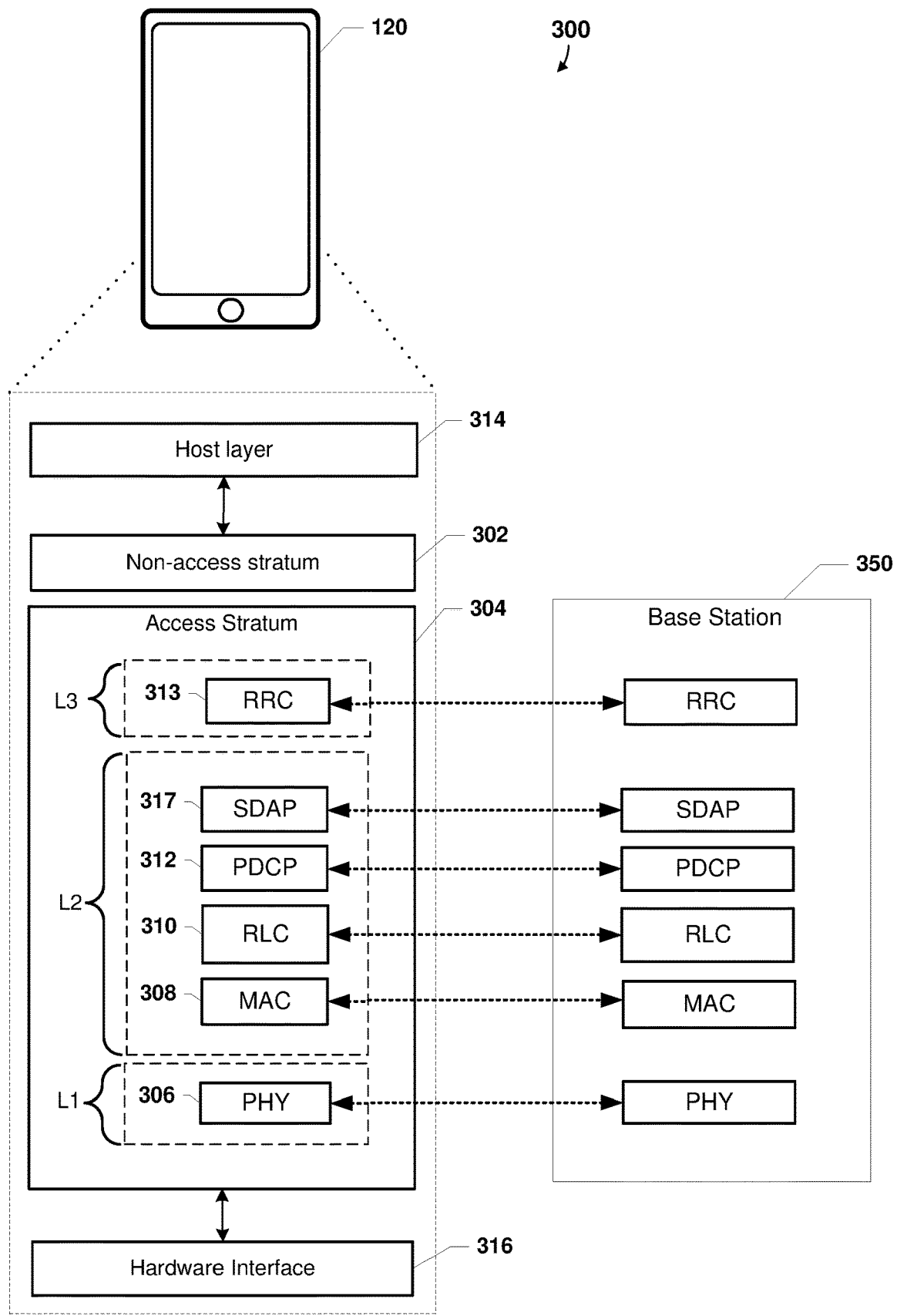
FIG. 3 is a component block diagram illustrating a software architecture including a radio protocol stack for the user and control planes in wireless communications suitable for implementing any of the various aspects.

FIG. 3 illustrates an example of a software architecture 300 including a radio protocol stack for the user and control planes in wireless communications between a base station 350 (e.g., base station 110a-110d) and a wireless device 120 (e.g., any of the wireless devices 120a-120e). With reference to FIGS. 1-3, the wireless device 120 may implement the software architecture 300 to communicate with the base station 350 of a communication system (e.g., 100). In various aspects, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to specific 5G NR communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the physical downlink control channel (PDCCH) and the physical downlink shared channel (PDSCH).

In the user and control planes, Layer 2 (L2) of the AS 304 may be responsible for the link between the wireless device 120 and the base station 350 over the physical layer 306. In some aspects, Layer 2 may include a media access control (MAC) sublayer 308, a radio link control (RLC) sublayer 310, a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some aspects, the RRC sublayer 313 may provide functions including broadcasting system information, paging, and establishing and releasing an RRC signaling connection between the wireless device 120 and the base station 350.

In some aspects, the SDAP sublayer 317 may provide mapping between Quality of Service (QoS) flows and data radio bearers (DRBs). In the downlink, at the base station 350, the SDAP sublayer 317 may provide mapping for DL QoS flows to DRBs. In the uplink, at the wireless device 120, the SDAP sublayer 317 may deliver DL received QoS flows to upper layers. In some aspects, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 120. In some aspects, application-specific functions provided by the at least one host layer 314 may provide an interface between the software architecture and the SOCs 202, 204.

In some other aspects, the software architecture 300 may include one or more higher logical layer (e.g., transport, session, presentation, application, etc.) that provide host layer functions. For example, in some aspects, the software architecture 300 may include a network layer (e.g., an Internet Protocol (IP) layer) in which a logical connection terminates at an access and mobility function (AMF) or a packet data network (PDN) gateway (PGW). In some aspects, the software architecture 300 may include an application layer in which a logical connection terminates at another device (e.g., end user device, server, etc.). In some aspects, the software architecture 300 may further include in the AS 304 a hardware interface 316 between the physical layer 306 and the communication hardware (e.g., one or more RF transceivers).

Figure 4:
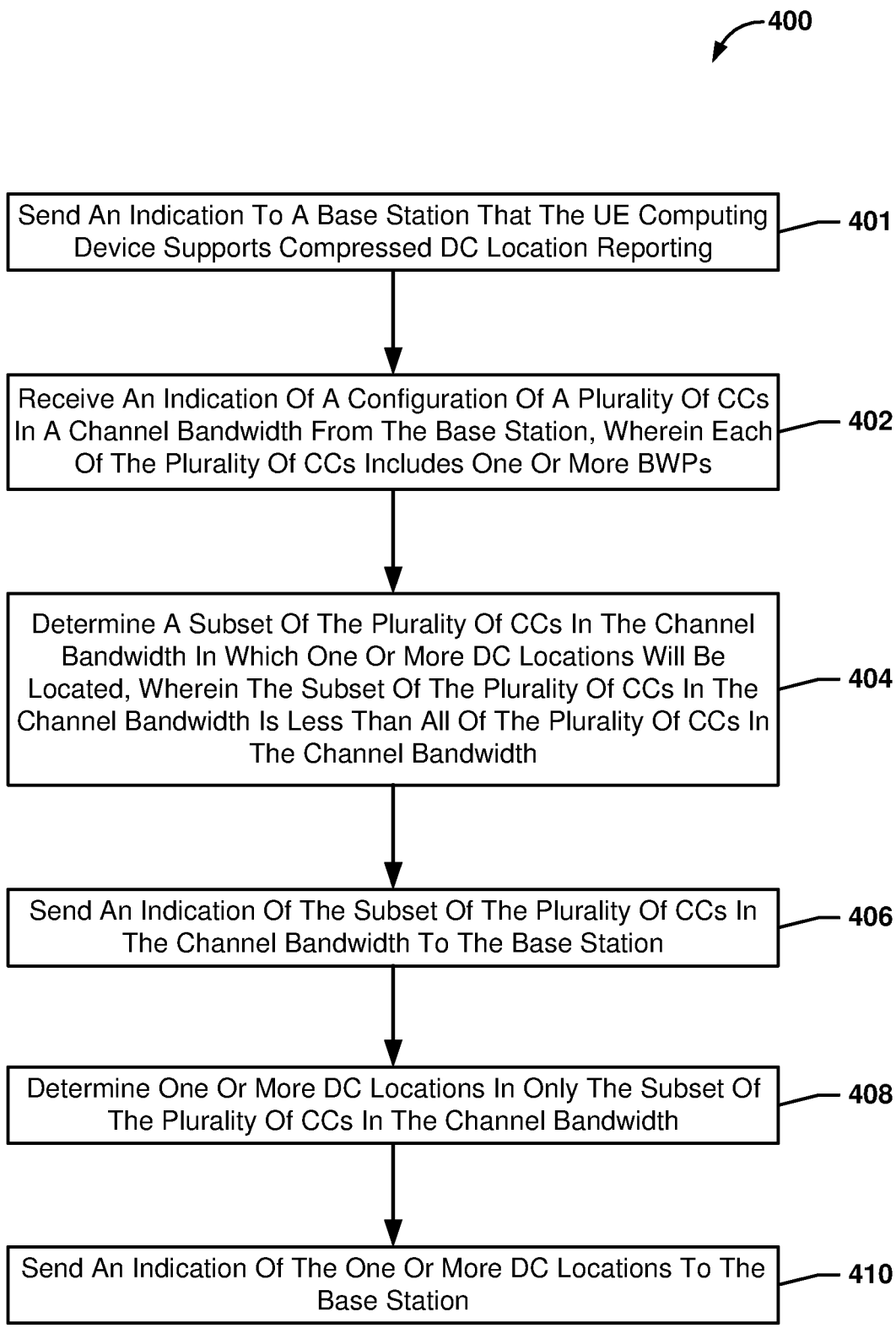
FIG. 4 is a process flow diagram illustrating a method that may be performed by a processor of a wireless device for direct current (DC) location according to various aspects.

FIG. 4 is a process flow diagram a method 400 for DC location reporting according to various aspects. With reference to FIGS. 1-4, the method 400 may be implemented by a processor (e.g., 212, 216, 252 or 260) of a wireless device (e.g., the wireless device 120, 120a-120e, 200). With reference to FIGS. 1-4, means for performing each of the operations of the method 400 may be one or more processors of a wireless device (e.g., the wireless device 120, 120a-120e, 200), such as one or more of the processors 212, 216, 252, 260).

In block 401, the processor may perform operations including sending an indication to a base station (e.g., a gNB) that the UE computing device supports compressed DC location reporting. As examples, the indication may be sent in a radio resource control (RRC) message, a medium access control (MAC) control element (MAC-CE) message, in uplink (UL) control information, etc. Sending an indication to the base station that the UE supports compressed DC location reporting may notify the base station that the UE may report the CC containing a DC location to the base station. Sending an indication to the base station that the UE supports compressed DC location reporting may notify the base station that DC locations for less than all possible activation permutations of BWPs of CCs in a channel bandwidth may be reported by the UE computing device. Sending an indication to the base station that the UE supports compressed DC location reporting may trigger the base station to determine and report a subset of activation permutations of BWPs of CCs in a channel bandwidth, such as the subset of activation permutations of BWPs of CCs in a channel bandwidth that are to be, or are likely to be, activated by the base station.

In block 402, the processor may perform operations including receiving an indication of a configuration of a plurality of CCs in a channel bandwidth from the base (e.g., the gNB), wherein each of the plurality of CCs includes one or more BWPs. For example, the base station may send an indication of the CCs in the channel bandwidth according to the CA scheme employed by the wireless network, for example a 5G NR network. For example, 2, 4, 8, or more CCs may be configured in the channel bandwidth. Each CC may have its own respective BWPs, such as 1 BWP, 2 BWPs, 3 BWPs, 4 BWPs, etc. In various aspects, the plurality of CCs in the channel bandwidth may be a plurality of UL CCs.

In block 404, the processor may perform operations including determining a subset of the plurality of CCs in the channel bandwidth in which one or more DC locations will be located, wherein the subset of the plurality of CCs in the channel bandwidth is less than all of the plurality of CCs in the channel bandwidth. The UE computing device may determine a subset of the plurality of CCs in the channel bandwidth in which one or more DC locations will be located by determining which permutations of possible BWP activation permutations impact the DC location for the UE computing and where the DC location moves to in the channel bandwidth in response to changing a BWP activation permutation. The UE computing device may determine that the DC location may always be associated with certain ones of the CCs in the channel bandwidth and/or that the DC location may never be associated with certain ones of the CCs in the channel bandwidth.

In block 406, the processor may perform operations including sending an indication of the subset of the plurality of CCs in the channel bandwidth to the base station. As examples, the indication may be sent in a RRC message, a MAC-CE message, in UL control information, etc. As an example, a UE computing device may determine that while four CCs are configured, such as CC1, CC2, CC3, and CC4, the DC location for the UE computing device may always be in two of the CCs, such as CC2 and CC3. In such an example, the UE computing device may indicate to the base station (e.g., the gNB), the DC location will always be in CC2 or CC3 and the UE computing device may not report DC locations for CC1 and CC4.

In block 408, the processor may perform operations including determining the one or more DC locations in only the subset of the plurality of CCs in the channel bandwidth. In this manner, less than all the DC locations of all possible CCs may be determined. For example, a UE computing device may determine only one DC location for each of the subset of the plurality of CCs in the channel bandwidth.

In block 410, the processor may perform operations including sending an indication of the one or more DC locations to the base station. As examples, the indication may be sent in a RRC message, a MAC-CE message, in UL control information, etc. In various aspects, a UE computing device may report the DC location only once per CC as a function of the permutations of the BWPs. For example, in a scenario in which two CCs are configured for a channel bandwidth, for each BWP permutation (e.g., 16 for 2 CCs at 4 BWP's each), there would be a 12+12 bit indication of the DC location. As another example, in a scenario in which a UE computing device may support a two power amplifier (2PA) architecture, there may be two DC locations for each BWP permutation.

Figure 5:
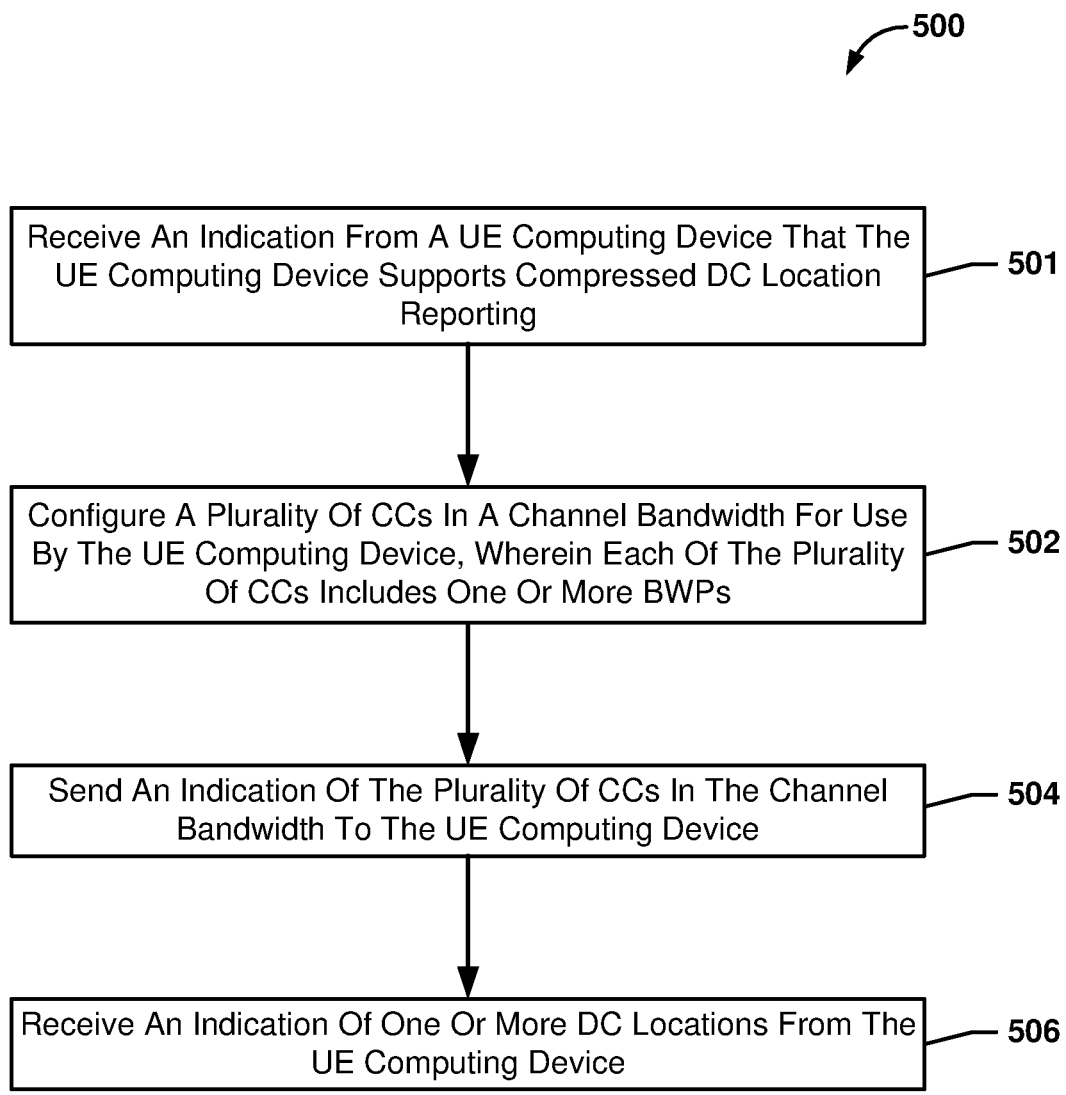
FIG. 5 is a process flow diagram illustrating a method that may be performed by a processor of a base station for DC location reporting according to various aspects.

FIG. 5 is a process flow diagram illustrating a method 500 for DC location reporting according to various aspects. With reference to FIGS. 1-5, the method 500 may be implemented by a processor of a base station (e.g., the base station 110a-110d, 350). With reference to FIGS. 1-5, means for performing each of the operations of the method 500 may be one or more processors of a base station (e.g., the base station 110a-110d, 350). In various aspects, the operations of method 500 may be performed in conjunction with the operations of method 400 (FIG. 4).

In block 501, the processor may perform operations including receiving an indication from a UE computing device that the UE computing device supports compressed DC location reporting. As examples, the indication may be received in a RRC message, a MAC-CE message, in UL control information, etc.

In block 502, the processor may perform operations including configuring a plurality of CCs in a channel bandwidth for use by the UE computing device, wherein each of the plurality of CCs includes one or more BWPs. For example, the base station may configure the CCs in the channel bandwidth according to the CA scheme employed by the wireless network, for example a 5G NR network. For example, 2, 4, 8, or more CCs may be configured in the channel bandwidth. Each CC may have its own respective BWPs, such as 1 BWP, 2 BWPs, 3 BWPs, 4 BWPs, etc. In various aspects, the plurality of CCs in the channel bandwidth may be a plurality of UL CCs.

In block 504, the processor may perform operations including sending an indication of the plurality of CCs in the channel bandwidth to the UE computing device. The indication may be a list of the plurality of CCs and their respective BWPs.

In block 506, the processor may perform operations including receiving an indication of one or more DC locations from the UE computing device. In various aspects, the one or more DC locations may be one or more DC locations in only the subset of the plurality of CCs in the channel bandwidth. In various aspects, the indication of the one or more DC locations may be received in a RRC message, a MAC-CE message, or in UL control information.

Figure 6:
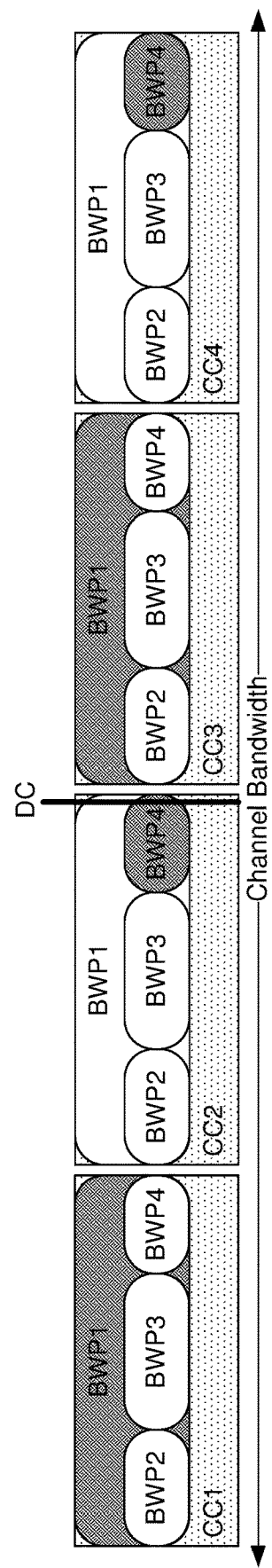
FIG. 6 is a block diagram of an example DC location within a plurality of component carriers (CCs) each having multiple bandwidth parts (BWPs) according to various aspects.

FIG. 6 illustrates an example channel bandwidth according to a CA scheme having a plurality of CCs with multiple BWPs. With reference to FIGS. 1-6, the channel bandwidth (or radio frequency (RF) bandwidth), may have four CCs, CC1, CC2, CC3, and CC4 each having their own respective BWPs, BWP1, BWP2, BWP3, and BWP4. FIG. 6 illustrates a BWP activation permutation in which BWP1 of CC1 is activated, BWP4 of CC2 is activated, BWP1 of CC3 is activated, and BWP4 of CC4 is activated and the DC location is in CC2. As an example, according to the operations of method 400 (FIG. 4) and/or method 500 (FIG. 5), a UE computing device may determine based on the CA scheme illustrated in FIG. 6 that the DC location will always be in CC2 or CC3 and the UE computing may not report DC locations for CC1 and CC4 to the base station.

Figure 7:
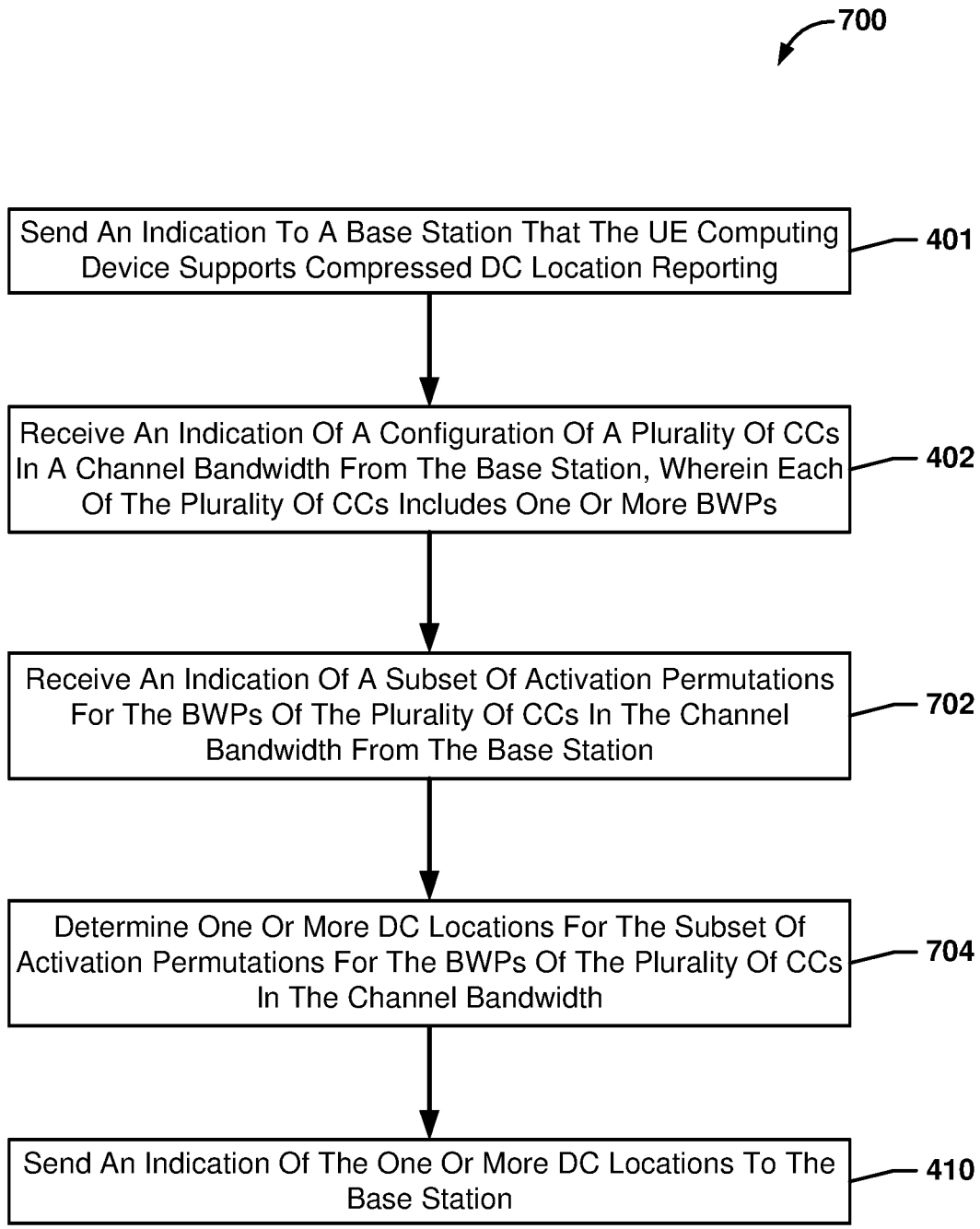
FIG. 7 is a process flow diagram illustrating a method that may be performed by a processor of a wireless device for DC location reporting according to various aspects.

FIG. 7 is a process flow diagram illustrating a method 700 for DC location reporting according to various aspects. With reference to FIGS. 1-7, the method 700 may be implemented by a processor (e.g., 212, 216, 252 or 260) of a wireless device (e.g., the wireless device 120, 120a-120e, 200). With reference to FIGS. 1-7, means for performing each of the operations of the method 700 may be one or more processors of a wireless device (e.g., the wireless device 120, 120a-120e, 200), such as one or more of the processors 212, 216, 252, 260). In various aspects, the operations of method 700 may be performed in conjunction with the operations of method 400 (FIG. 4) and/or method 500 (FIG. 5).

In blocks 401 and 402, the processor may perform operations of like numbered blocks of method 400 described with reference to FIG. 4 to send an indication to a base station (e.g., a gNB) that the UE computing device supports compressed DC location reporting and receive an indication of a configuration of a plurality of CCs in a channel bandwidth from the base (e.g., the gNB), wherein each of the plurality of CCs includes one or more BWPs.

In block 702, the processor may perform operations including receiving an indication of a subset of activation permutations for the BWPs of the plurality of CCs in the channel bandwidth from the base station. In various aspects, the subset of activation permutations may be less than all possible activation permutations of the BWPs of the plurality of CCs in the channel bandwidth. In various aspects, a base station (e.g., a gNB) may limit a number of BWP permutations to be considered by a UE computing device for the CCs configured in a channel bandwidth. A base station (e.g., a gNB) may indicate the BWP permutations that will be activated across the configured CCs for the channel bandwidth to a UE computing device. For example, the base station may send a bitmap of the BWP permutations that will be activated across the configured CCs for the channel bandwidth. In some aspects, the indication may be an indication of specific BWP permutations. In some aspects, the indication may be an indication of schemes (or relationships) for BWP activation across CCs (e.g., when a BWP in a selected CC is activated, only a specific BWP in another CC may be activated). In some aspects, the indication of the subset of activation permutations for the BWPs of the plurality of CCs in the channel bandwidth may be a list of permutations of BWPs for each CC of the plurality of CCs in the channel bandwidth that will be activated together. In some aspects, the indication of the subset of activation permutations for the BWPs of the plurality of CCs in the channel bandwidth may be a list of permutations of BWPs for each CC of the plurality of CCs in the channel bandwidth in an order of probability of actual activation. In some aspects, the indication may be a list of permutations of BWPs for each CC of the plurality of CCs in the channel bandwidth in an order of preference for activation by the wireless network, for example a 5G NR network. In some aspects, each permutation may be associated with a unique permutation identifier (ID).

In block 704, the processor may perform operations including determining one or more DC locations for the subset of activation permutations for the BWPs of the plurality of CCs in the channel bandwidth. As an example, with eight CCs and 4 BWPs per CC, a base station (e.g., a gNB) may send a 16-bit (e.g., 8×2) bitmap for each BWP permutation that will be activated by the base station (e.g., the gNB). As an example, a base station (e.g., a gNB) may indicate to a UE computing device that for a channel bandwidth having four CCs, CC1, CC2, CC3, and CC4, whenever CC1 and CC4 are activated, the BWPs in CC2 and CC3 are always full channel BWPs (e.g., BWP 1 for the CC2 and CC3, respectively). In this manner, the UE computing device may only determine and report DC locations based on CC1 and CC4 BWPs.

In block 410, the processor may perform operations of like numbered block of method 400 described with reference to FIG. 4 to send an indication of the one or more DC locations to the base station. As an example, the UE computing device may send a list of the active permutations in order to the base station with the DC locations for each permutation in the list. The list may be in the order of the BWP permutations without including the bitmaps singled by the base station.

Figure 8:
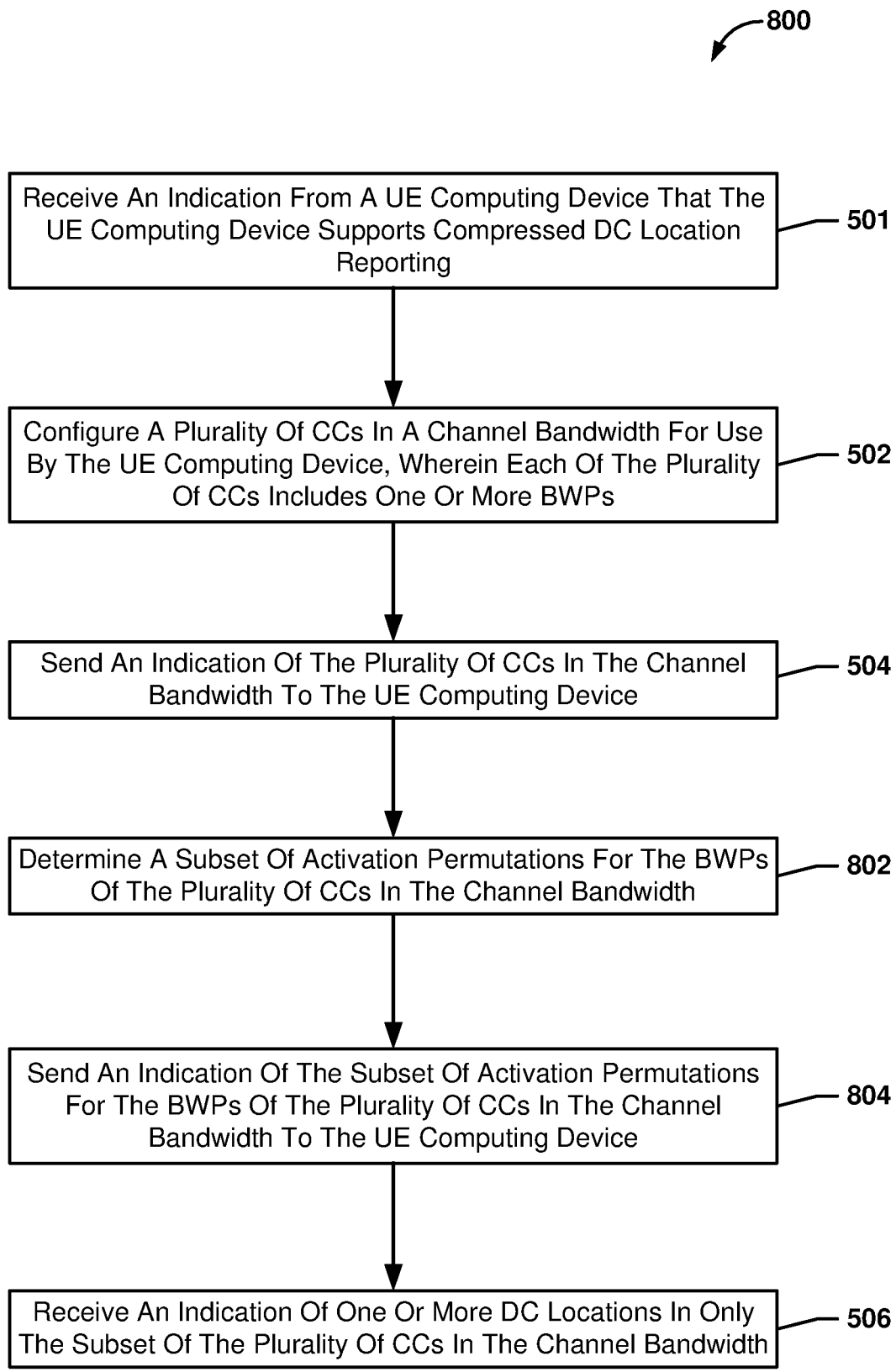
FIG. 8 is a process flow diagram illustrating a method that may be performed by a processor of a base station for DC location reporting according to various aspects.

FIG. 8 is a process flow diagram illustrating a method 800 for DC location reporting according to various aspects. With reference to FIGS. 1-8, the method 800 may be implemented by a processor of a base station (e.g., the base station 110a-110d, 350). With reference to FIGS. 1-8, means for performing each of the operations of the method 800 may be one or more processors of a base station (e.g., the base station 110a-110d, 350). In various aspects, the operations of method 800 may be performed in conjunction with the operations of method 400 (FIG. 4), method 500 (FIG. 5), and/or method 700 (FIG. 7).

In blocks 501, 502, and 504, the processor may perform operations of like numbered blocks of method 500 described with reference to FIG. 5 to receive an indication from a UE computing device that the UE computing device supports compressed DC location reporting, configure a plurality of CCs in a channel bandwidth for use by the UE computing device, wherein each of the plurality of CCs includes one or more BWPs, and send an indication of the plurality of CCs in the channel bandwidth to the UE computing device.

In block 802, the processor may perform operations including determining a subset of activation permutations for the BWPs of the plurality of CCs in the channel bandwidth. In various aspects, the subset of activation permutations may be less than all possible activation permutations of the BWPs of the plurality of CCs in the channel bandwidth. In various aspects, a base station (e.g., a gNB) may limit a number of BWP permutations to be considered by a UE computing device for the CCs configured in a channel bandwidth.

In block 804, the processor may perform operations including sending an indication of the subset of activation permutations for the BWPs of the plurality of CCs in the channel bandwidth to the UE computing device. A base station (e.g., a gNB) may indicate the BWP permutations that will be activated across the configured CCs for the channel bandwidth to a UE computing device. For example, the base station may send a bitmap of the BWP permutations that will be activated across the configured CCs for the channel bandwidth. In some aspects, the indication may be an indication of specific BWP permutations. In some aspects, the indication may be an indication of schemes (or relationships) for BWP activation across CCs (e.g., when a BWP in a selected CC is activated, only a specific BWP in another CC may be activated. In some aspects, the indication of the subset of activation permutations for the BWPs of the plurality of CCs in the channel bandwidth may be a list of permutations of BWPs for each CC of the plurality of CCs in the channel bandwidth that will be activated together. In some aspects, the indication may be a list of permutations of BWPs for each CC of the plurality of CCs in the channel bandwidth in an order of probability of actual activation. In some aspects, the indication may be a list of permutations of BWPs for each CC of the plurality of CCs in the channel bandwidth in an order of preference for activation by the wireless network, for example a 5G NR network. In some aspects, each permutation may be associated with a unique permutation identifier (ID).

In block 506, the processor may perform operations of like numbered block of method 500 described with reference to FIG. 5 to receive an indication of the one or more DC locations from the UE computing device. As an example, the indication of the one or more DC locations may be a list of the active permutations in order with the DC locations for each permutation in the list. The list may be in the order of the BWP permutations without including the bitmaps singled by the base station.

Figure 9:
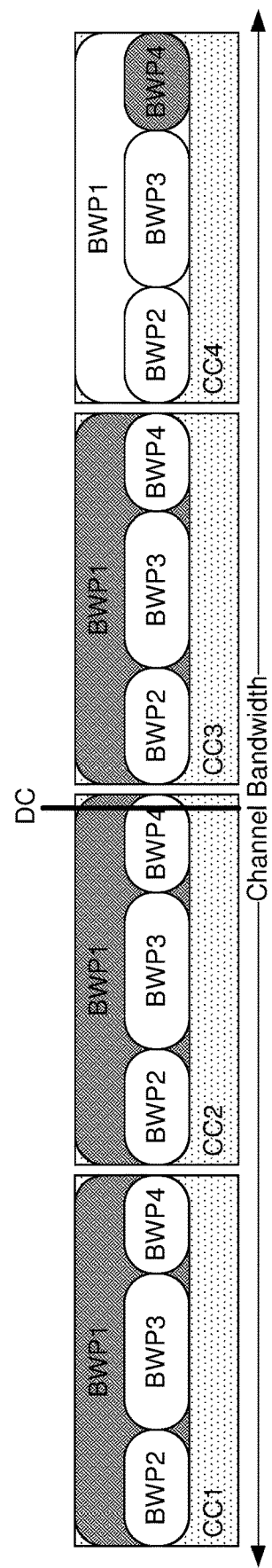
FIG. 9 is a block diagram of an example DC location within a plurality of CCs each having multiple BWPs according to various aspects.

FIG. 9 illustrates an example channel bandwidth according to a CA scheme having a plurality of CCs with multiple BWPs. With reference to FIGS. 1-9, the channel bandwidth (or radio frequency (RF) bandwidth), may have four CCs, CC1, CC2, CC3, and CC4 each having their own respective BWPs, BWP1, BWP2, BWP3, and BWP4. FIG. 9 illustrates a BWP activation permutation in which BWP1 of CC1 is activated, BWP1 of CC2 is activated, BWP1 of CC3 is activated, and BWP4 of CC4 is activated and the DC location is in CC2. As an example, according to the operations of methods 400 (FIG. 4), 500 (FIG. 5), 600 (FIG. 6), and/or 700 (FIG. 7), a base station (e.g., a gNB) may indicate to a UE computing device that whenever CC1 and CC4 are activated, the BWPs in CC2 and CC3 are always full channel BWPs (e.g., BWP 1 for the CC2 and CC3, respectively). In this manner, the UE computing device may only determine and report DC locations based on CC1 and CC4 BWPs.

Figure 10:
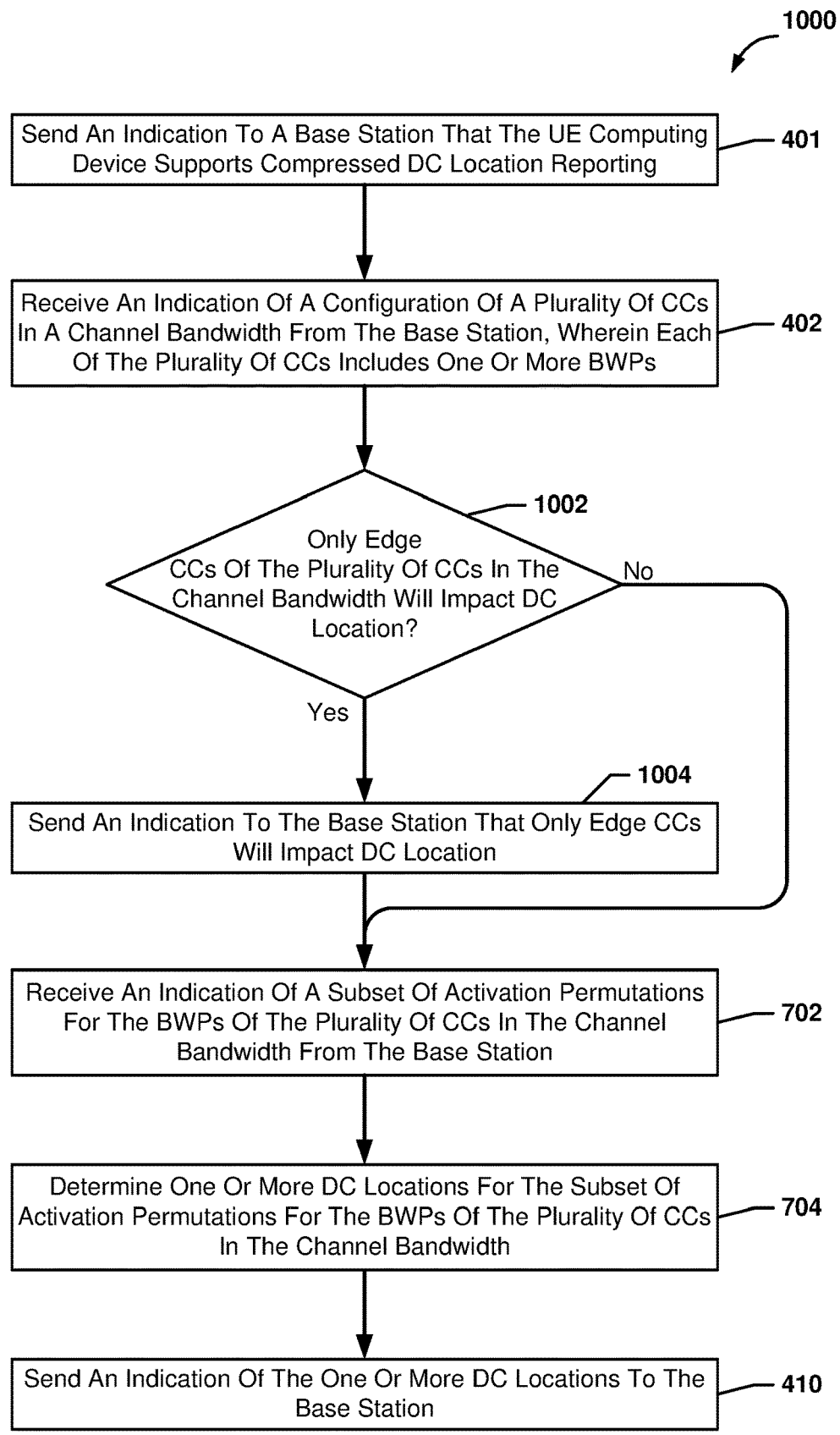
FIG. 10 is a process flow diagram illustrating a method that may be performed by a processor of a wireless device for DC location reporting according to various aspects.

FIG. 10 is a process flow diagram illustrating a method 1000 for DC location reporting according to various aspects. With reference to FIGS. 1-10, the method 1000 may be implemented by a processor (e.g., 212, 216, 252 or 260) of a wireless device (e.g., the wireless device 120, 120a-120e, 200). With reference to FIGS. 1-10, means for performing each of the operations of the method 1000 may be one or more processors of a wireless device (e.g., the wireless device 120, 120a-120e, 200), such as one or more of the processors 212, 216, 252, 260). In various aspects, the operations of method 1000 may be performed in conjunction with the operations of method 400 (FIG. 4), method 500 (FIG. 5), method 700 (FIG. 7), and/or method 800 (FIG. 8).

In blocks 401 and 402, the processor may perform operations of like numbered blocks of method 400 described with reference to FIG. 4 to send an indication to a base station (e.g., a gNB) that the UE computing device supports compressed DC location reporting and receive an indication of a configuration of a plurality of CCs in a channel bandwidth from the base (e.g., the gNB), wherein each of the plurality of CCs includes one or more BWPs.

In determination block 1002, the processor may perform operations including determining whether only edge CCs of the plurality of CCs in the channel bandwidth will impact DC location. For example, when an activated BWP changes in a CC that is between two other CC's, the change in the activated BWP may not impact the DC location. In contrast, when the activated BWP in an edge CC changes, that change in active BWP may impact the DC location. In various aspects, the UE computing device may analyze the configuration of the plurality of CCs in the channel bandwidth to determine whether only edge CCs of the plurality of CCs in the channel bandwidth will impact DC location.

In response to determining that only edge CCs of the plurality of CCs in the channel bandwidth will impact DC location (i.e., determination block 1002="Yes"), the processor may perform operations including sending an indication to the base station that only edge CCs will impact DC location in block 1004. As examples, the indication may be sent in a RRC message, a MAC-CE message, in UL control information, etc. In various aspects in which the UE computing device may indicate to a base station (e.g., a gNB) that for a series of configured CCs in the channel bandwidth, only the edge CC BWPs will impact the DC location for the UE computing device, the base station may inform the UE computing device of only the edge most CC BWP permutations to be activated in the channel bandwidth and may request the UE computing device indicate DC locations based only those edge most CC BWP permutations.

In response to sending the indication to the base station that only edge CCs will impact DC location or in response to determining that CCs other than edge CCs of the plurality of CCs in the channel bandwidth will impact DC location (i.e., determination block 1002="No"), the processor may perform operations of like numbered block 702 of method 700 described with reference to FIG. 7 to receive an indication of a subset of activation permutations for the BWPs of the plurality of CCs in the channel bandwidth from the base station. In some aspects, the subset of activation permutations may be activation permutations of the BWPs of the edge CCs of the plurality of CCs in the channel bandwidth.

In block 704, the processor may perform operations of like numbered block of method 700 described with reference to FIG. 7 to determine one or more DC locations for the subset of activation permutations for the BWPs of the plurality of CCs in the channel bandwidth. For example, the one or more DC locations for the subset of activation permutations for the BWPs of the plurality of CCs in the channel bandwidth may be one or more DC locations for the BWPs of only the edge CCs in the channel bandwidth.

In block 410, the processor may perform operations of like numbered block of method 400 described with reference to FIG. 4 to send an indication of the one or more DC locations to the base station. As an example, the UE computing device may send a list of the active permutations in order to the base station with the DC locations for each permutation in the list. The list may be in the order of the BWP permutations without including the bitmaps singled by the base station.

Figure 11:
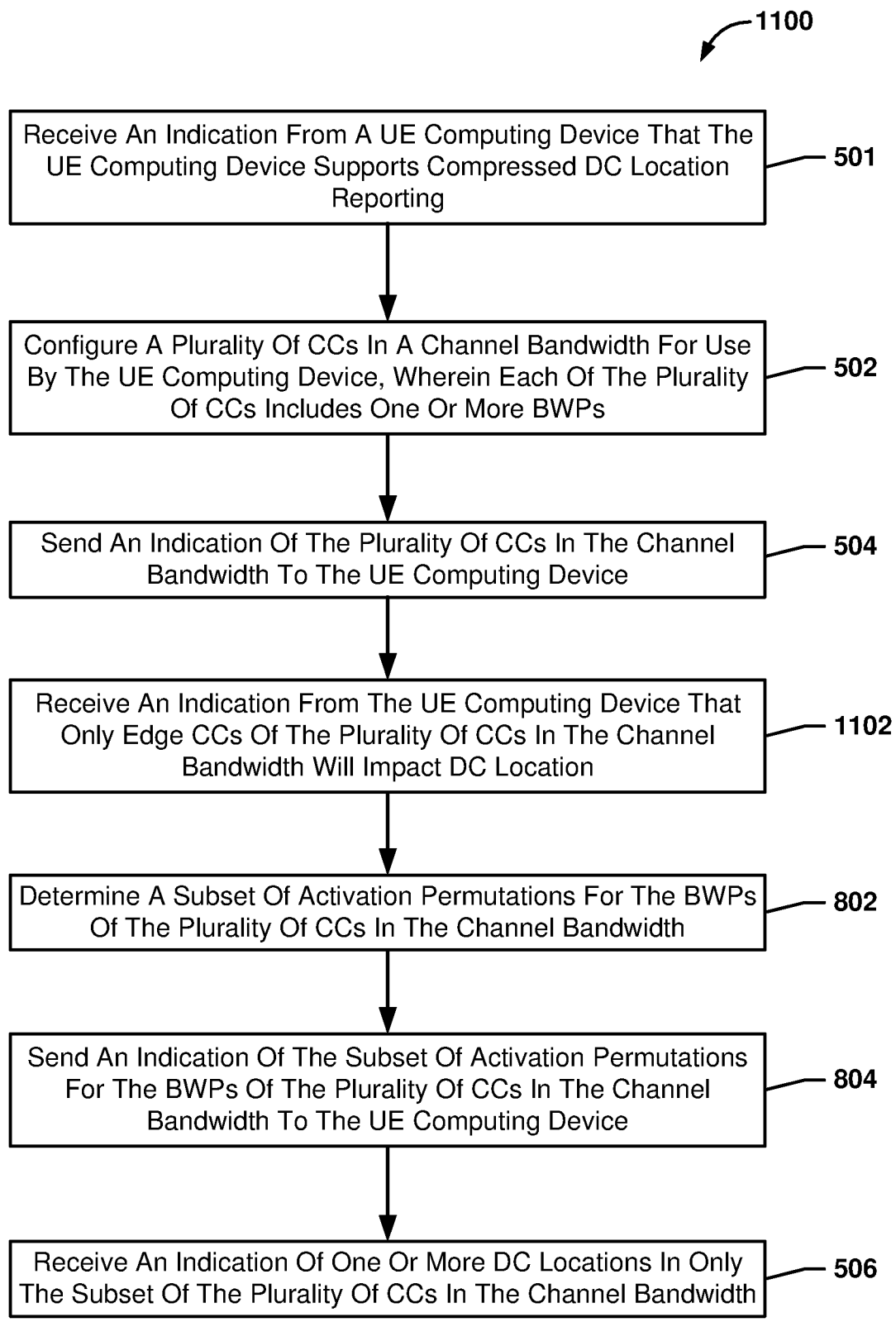
FIG. 11 is a process flow diagram illustrating a method that may be performed by a processor of a base station for DC location reporting according to various aspects.

FIG. 11 is a process flow diagram illustrating a method 1100 for DC location reporting according to various aspects. With reference to FIGS. 1-11, the method 1100 may be implemented by a processor of a base station (e.g., the base station 110a-110d, 350). With reference to FIGS. 1-11, means for performing each of the operations of the method 1100 may be one or more processors of a base station (e.g., the base station 110a-110d, 350). In various aspects, the operations of method 1100 may be performed in conjunction with the operations of method 400 (FIG. 4), method 500 (FIG. 5), method 700 (FIG. 7), method 800 (FIG. 8), and method 1000 (FIG. 10).

In blocks 501, 502, and 504, the processor may perform operations of like numbered blocks of method 500 described with reference to FIG. 5 to receive an indication from a UE computing device that the UE computing device supports compressed DC location reporting, configure a plurality of CCs in a channel bandwidth for use by the UE computing device, wherein each of the plurality of CCs includes one or more BWPs, and send an indication of the plurality of CCs in the channel bandwidth to the UE computing device.

In block 1102, the processor may perform operations including receiving an indication from the UE computing device that only edge CCs of the plurality of CCs in the channel bandwidth will impact DC location.

In blocks 802 and 804, the processor may perform operations of like numbered blocks of method 800 described with reference to FIG. 8 to determine a subset of activation permutations for the BWPs of the plurality of CCs in the channel bandwidth and send an indication of the subset of activation permutations for the BWPs of the plurality of CCs in the channel bandwidth to the UE computing device. In various aspects in which the UE computing device may indicate to a base station (e.g., a gNB) that for a series of configured CCs in the channel bandwidth, only the edge CC BWPs will impact the DC location for the UE computing device, the base station may inform the UE computing device of only the edge most CC BWP permutations to be activated in the channel bandwidth and may request the UE computing device indicate DC locations based only those edge most CC BWP permutations.

In block 506, the processor may perform operations of like numbered block of method 500 described with reference to FIG. 5 to receive an indication of the one or more DC locations from the UE computing device. As an example, the indication of the one or more DC locations may be a list of the active permutations in order with the DC locations for each permutation in the list. The list may be in the order of the BWP permutations without including the bitmaps singled by the base station.

Figure 12:
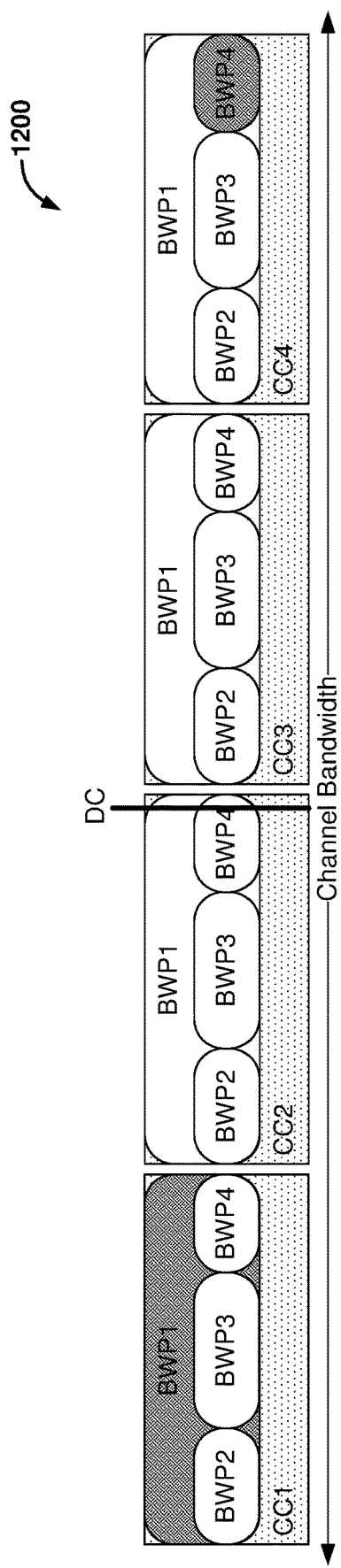
FIG. 12 is a block diagram of an example DC location within a plurality of CCs each having multiple BWPs according to various aspects.

FIG. 12 illustrates an example channel bandwidth according to a CA scheme having a plurality of CCs with multiple BWPs. With reference to FIGS. 1-12, the channel bandwidth (or radio frequency (RF) bandwidth), may have four CCs, CC1, CC2, CC3, and CC4 each having their own respective BWPs, BWP1, BWP2, BWP3, and BWP4. FIG. 12 illustrates a BWP activation permutation in which BWP1 of CC1 is activated, BWP1 of CC2 is activated, BWP1 of CC3 is activated, and BWP4 of CC4 is activated and the DC location is in CC2. As an example, according to the operations of method 400 (FIG. 4), method 500 (FIG. 5), method 700 (FIG. 7), method 800 (FIG. 8), method 1000 (FIG. 10), and/or method 1100 (FIG. 11), a UE computing device may determine based on the CA scheme illustrated in FIG. 9 that the DC location will only be impacted by BWP activations in the edge CCs, CC1 and CC4 and not the middle CCs, CC2 and CC3. The UE computing device may report to the base station that only edge CCs (CC1 and CC4) will impact DC location (or that middle CCs (CC2 and CC3) will not impact DC location). In response to receiving the indication that only edge CCs (CC1 and CC4) will impact DC location, the base station may inform the UE computing device of only BWP permutations at the edge CCs, CC1 and CC4.

Figure 13:
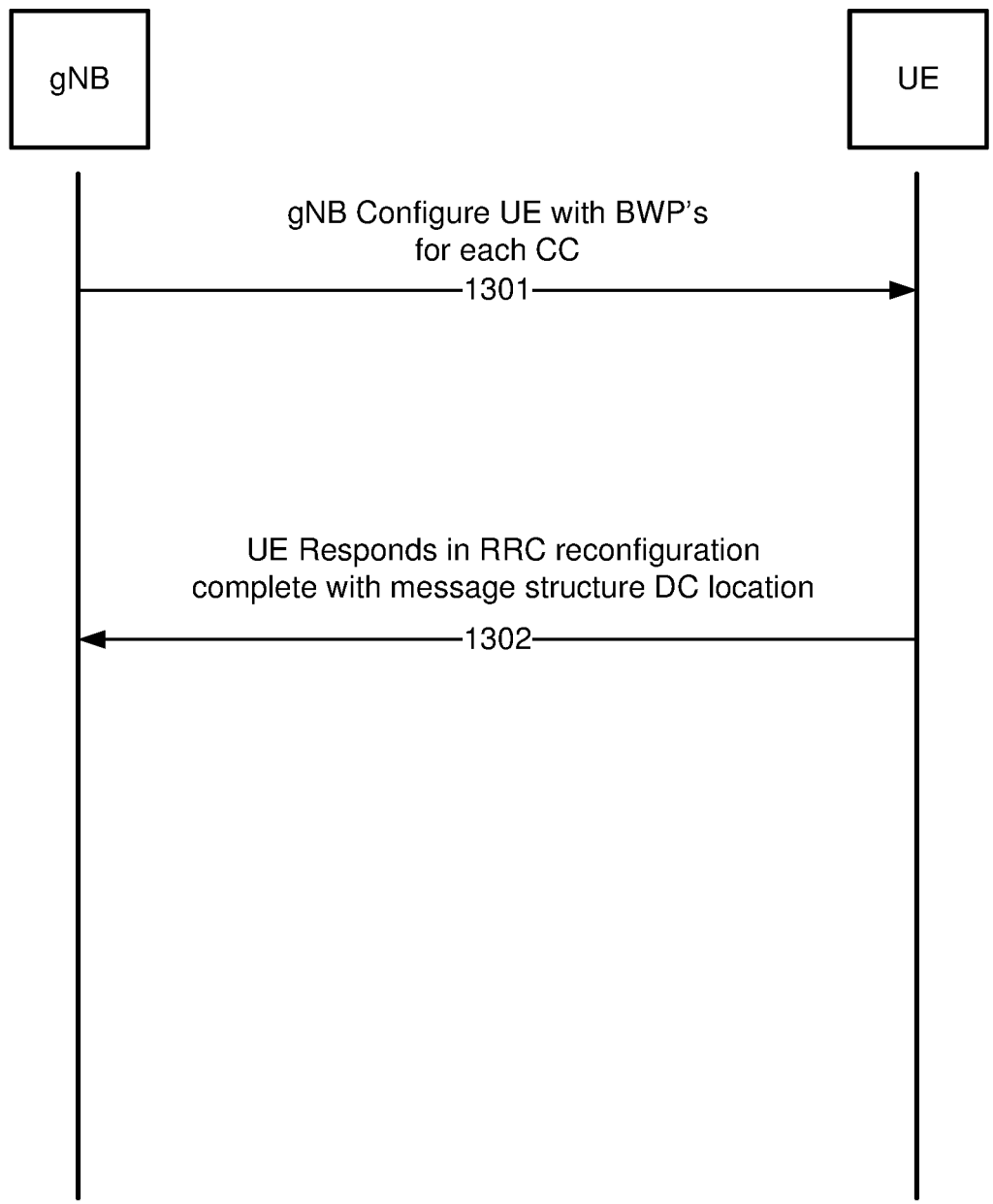
FIG. 13 is a call flow diagram illustrating example interactions between a base station and UE computing device for DC location reporting according to various aspects.

FIG. 13 is a call flow diagram illustrating example interactions between a base station and UE computing device for DC location reporting according to various aspects. With reference to FIGS. 1-13, the interactions illustrated in FIG. 13 may be interactions according to the operations of method 400 (FIG. 4), method 500 (FIG. 5), method 700 (FIG. 7), method 800 (FIG. 8), method 1000 (FIG. 10), and/or method 1100 (FIG. 11).

As illustrated in FIG. 13, a base station (e.g., a gNB) may configure BWPs for each CC in a channel bandwidth and indicate the configuration of the BWPs and CCs to a UE computing device in operation 1301. The configuration information set from the base station (e.g., the gNB) to the UE computing device may include a list of BWPs that are to be activated simultaneously. The list may include permutation identifiers (IDs) of eight bits. The permutation IDs may be associated with lists of BWPs for each CC, such as 8×2 bits per list. Each permutation ID may be unique and associated with its own respective BWP list. As an example, the list structure may be "Permutation ID (8 bits), list of BWPs for each CC, 8×2 bits; next Permutation ID (8 bits), list of BWPs for each CC, 8×2 bits; . . . ".

The UE computing device may respond with a RRC configuration complete message with the structure DC location where the list structure corresponds to each permutation ID associated with the CC with DC identification for that permutation, and the DC location for that permutation in operation 1302. In this manner, each permutation ID (e.g., permutation ID1, permutation ID2, etc.) may be associated with its own respective CC containing the DC for that permutation and its own respective DC location for that permutation. For example, the CC may be a 3-bit indication and the DC location may be an 8-bit indication. In scenarios in which the UE computing device has declared it supports a 2PA architecture, a second CC and a second DC location indication may be associated with each permutation ID. As an example, the list structure may be "Permutation ID1 (8 bits), the CC with DC identification (3 bits), DC location (8 bits); Permutation ID2 (8 bits), the CC with DC identification (3 bits), DC location (8 bits); . . . ". As an example, where the UE computing device supports a 2PA architecture, the list structure may be "Permutation ID1 (8 bits), the first CC with first DC identification (3 bits), first DC location (8 bits), the second CC with second DC identification (3 bits), second DC location (8 bits); Permutation ID2 (8 bits), the first CC with first DC identification (3 bits), first DC location (8 bits), the second CC with second DC identification (3 bits), second DC location (8 bits); . . . ". The permutation ID itself from the base station and/or from the UE computing device may be optional when the UE computing device responds with a list in the same order as sent by the base station.

Figure 14:
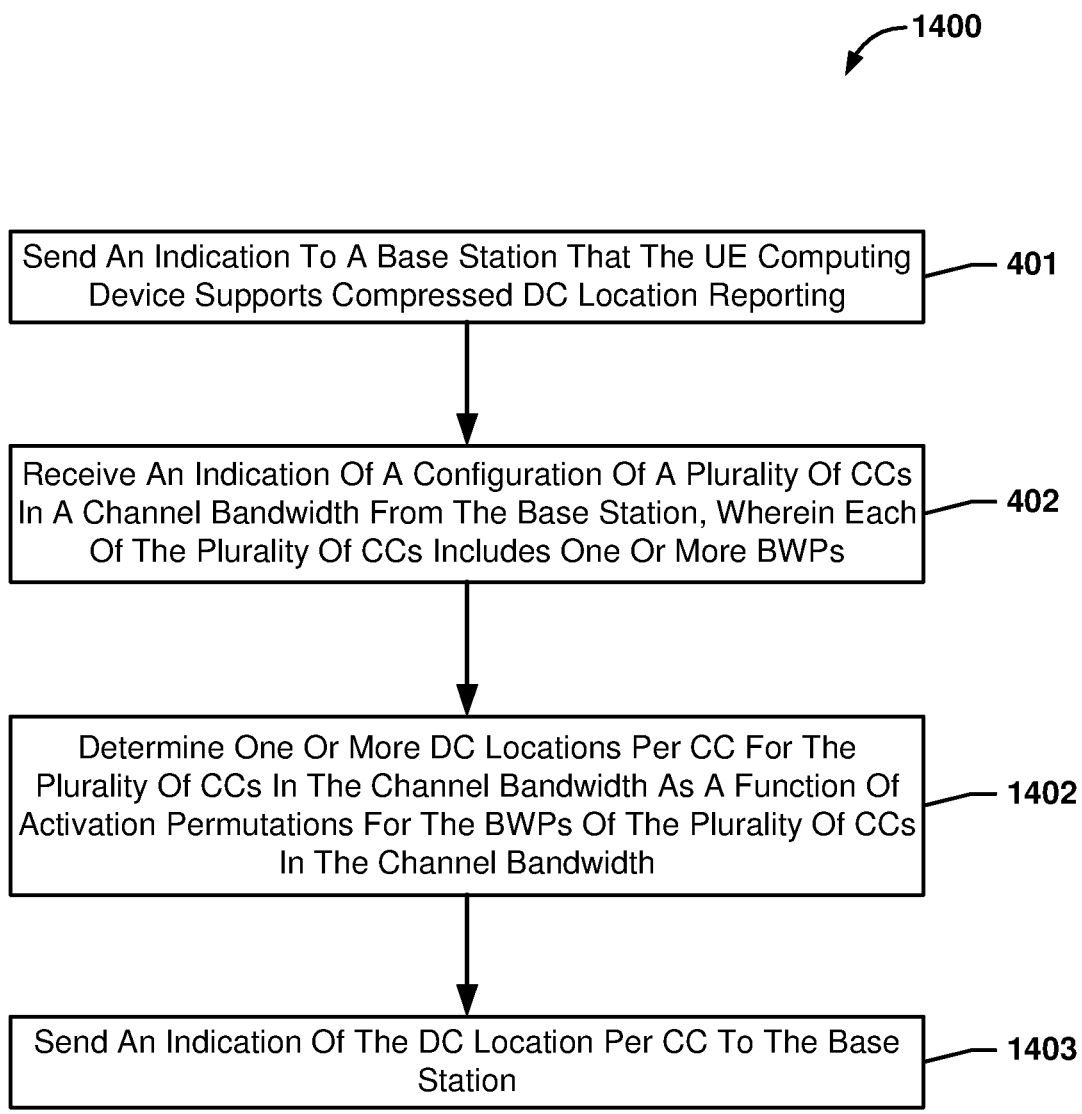
FIG. 14 is a process flow diagram illustrating a method that may be performed by a processor of a wireless device for DC location reporting according to various aspects.

FIG. 14 is a process flow diagram illustrating a method 1400 for DC location reporting according to some aspects. With reference to FIGS. 1-14, the method 1400 may be implemented by a processor (e.g., 212, 216, 252 or 260) of a wireless device (e.g., the wireless device 120, 120a-120e, 200). With reference to FIGS. 1-14, means for performing each of the operations of the method 1400 may be one or more processors of a wireless device (e.g., the wireless device 120, 120a-120e, 200), such as one or more of the processors 212, 216, 252, 260). In various aspects, the operations of the method 1400 may be performed in conjunction with the operations of the method 400 (FIG. 4), the method 500 (FIG. 5), method 700 (FIG. 7), the method 800 (FIG. 8), the method 1000 (FIG. 10), the method 1100 (FIG. 11), and/or the method 1200 (FIG. 12).

In blocks 401 and 402, the processor may perform operations of like numbered blocks of the method 400 described with reference to FIG. 4 to send an indication to a base station (e.g., a gNB) that the UE computing device supports compressed DC location reporting and receive an indication of a configuration of a plurality of CCs in a channel bandwidth from the base (e.g., the gNB), wherein each of the plurality of CCs includes one or more BWPs.

In block 1402, the processor may perform operations including determining one or more DC locations per CC for the plurality of CCs in the channel bandwidth as a function of activation permutations for the BWPs of the plurality of CCs in the channel bandwidth. In some aspects, the DC locations may be determined based on the BWP configuration for the channel bandwidth, such as based on the activated BWPs for the channel bandwidth. In some aspects, the DC locations may be determined regardless of the BWP configuration for the channel bandwidth, such as regardless of the activated BWPs. In some aspects, determining one or more DC locations per CC for the plurality of CCs in the channel bandwidth may include determining one DC location per CC for the plurality of CCs in the channel bandwidth. For example, the channel bandwidth may have 2 to 16 CCs configured in a CA scenario, and a DC location per CC may be determined by the UE computing device. In some aspects, determining one or more DC locations per CC for the plurality of CCs in the channel bandwidth may include determining two DC locations per CC. For example, when a UE computing device supports a 2PA architecture, there may be two DC locations for each CC.

In block 1403, the processor may perform operations including sending an indication of the DC location per CC to the base station. As examples, the indication may be sent in a RRC message, a MAC-CE message, in UL control information, etc. In some aspects, a UE computing device may report the DC location only once per CC as a function of the BWP activations. For example, in a scenario in which two CCs are configured for a channel bandwidth, two DC locations may be reported. In some aspects, a UE computing device may report the DC location more than once per CC as a function of the BWP activations. As an example, in a scenario in which a UE computing device supports a 2PA architecture, the UE computing device may report two DC locations per CC as a function of the BWP activations. In some aspects, a UE computing device may report the DC location only once per CC regardless of the BWP activations. For example, in a scenario in which two CCs are configured for a channel bandwidth, two DC locations may be reported. In some aspects, a UE computing device may report the DC location more than once per CC regardless of the BWP activations. As an example, in a scenario in which a UE computing device supports a 2PA architecture, the UE computing device may report two DC locations per CC regardless of the BWP activations.

Figure 15:
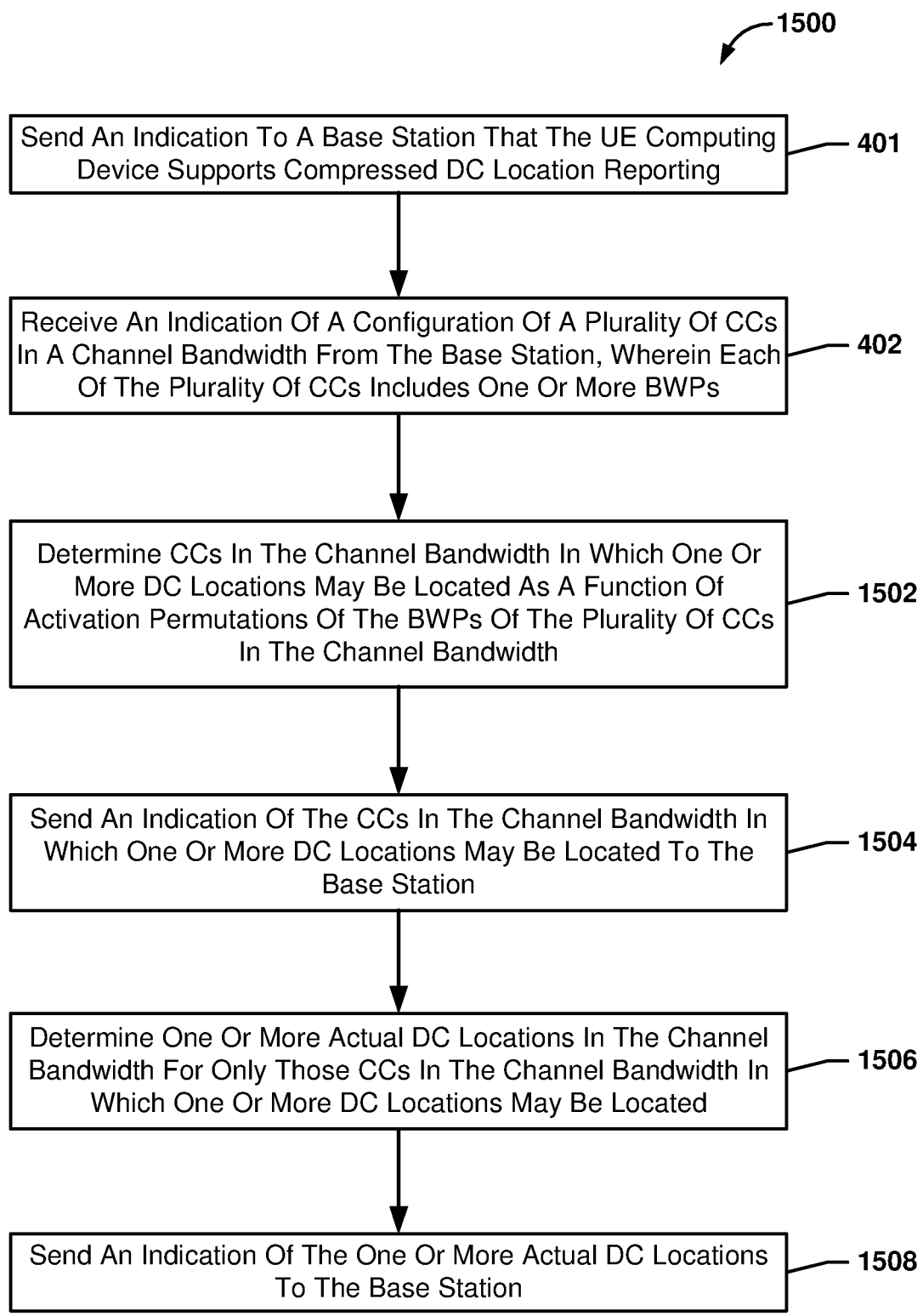
FIG. 15 is a process flow diagram illustrating a method that may be performed by a processor of a wireless device for DC location reporting according to various aspects.

FIG. 15 is a process flow diagram illustrating a method 1500 for DC location reporting according to various aspects. With reference to FIGS. 1-15, the method 1500 may be implemented by a processor (e.g., 212, 216, 252 or 260) of a wireless device (e.g., the wireless device 120, 120a-120e, 200). With reference to FIGS. 1-15, means for performing each of the operations of the method 1500 may be one or more processors of a wireless device (e.g., the wireless device 120, 120a-120e, 200), such as one or more of the processors 212, 216, 252, 260). In various aspects, operations of the method 1500 may be performed in conjunction with the operations of the method 400 (FIG. 4), the method 500 (FIG. 5), the method 700 (FIG. 7), the method 800 (FIG. 8), the method 1000 (FIG. 10), the method 1100 (FIG. 11), the method 1200 (FIG. 12), and/or the method 1400 (FIG. 14).

In blocks 401 and 402, the processor may perform operations of like numbered blocks of the method 400 as described with reference to FIG. 4 to send an indication to a base station (e.g., a gNB) that the UE computing device supports compressed DC location reporting and receive an indication of a configuration of a plurality of CCs in a channel bandwidth from the base (e.g., the gNB), in which each of the plurality of CCs includes one or more BWPs.

In block 1502, the processor may perform operations including determining CCs in the channel bandwidth in which one or more DC locations may be located as a function of activation permutations for the BWPs of the plurality of CCs in the channel bandwidth. In some aspects, a UE computing device may report the DC location in a subset of the CCs and may report the DC location only for these CCs as a function of activation permutations for the BWPs for the UE computing device. In some aspects, a UE computing device may report the DC location in a subset of the CCs and may report the DC location only for those CCs regardless of the BWP activation permutations for the UE computing device. In some aspects, a UE computing device may be configured to determine the CCs of the plurality of CCs configured by a base station that may include DC locations with, or without, regard to the BWP configuration or activations. For example, based on the CC arrangement and the configuration of the UE computing device, the UE computing device may determine that DC locations will not fall in certain ones of the CCs (e.g., edge CCs, etc.), that all CCs will include DC locations, that only a single CC will include DC locations, etc. In this manner, the UE computing device may determine CCs having DC locations without BWP activation information from a base station. As another example, based on the CC arrangement, the configuration of the UE computing device, and the activation permutations for the BWPs of the CCs, the UE computing device may determine that DC locations will not fall in certain ones of the CCs (e.g., edge CCs, etc.), that all CCs will include DC locations, that only a single CC will include DC locations, etc. In this manner, the UE computing device may determine CCs having DC locations as a function of BWP activation information from a base station.

In block 1504, the processor may perform operations including sending an indication of the CCs in the channel bandwidth in which one or more DC locations may be located to the base station. As examples, the indication may be sent in a RRC message, a MAC-CE message, in UL control information, etc.

In block 1506, the processor may perform operations including determining one or more actual DC locations in the channel bandwidth for only the CCs in the channel bandwidth in which one or more DC locations may be located. In some aspects, the UE computing device may be configured to determine one or more actual DC locations in the channel bandwidth for only the CCs in the channel bandwidth in which one or more DC locations may be located. In this manner, CCs that are not likely to include DC locations, may be skipped (or disregarded) by the UE computing in determining actual DC locations. Additionally, the actual DC locations may be determined for just the CCs that are likely to include DC locations without regard to the BWP activation in those CCs. Alternatively, the actual DC locations may be determined for just the CCs that are likely to include DC locations as a function of the activation permutations for the BWPs of the CCs. In some aspects, the UE computing device may send an indication of the one or more actual DC locations to the base station. As an example, the processor may determine only a single CC of the plurality of CCs that contains a DC location, and the processor may determine and indicate only a single actual DC location for only that single CC. In various aspects, the processor may determine the CCs in the channel bandwidth in which one or more DC locations may be located as a function of activation permutations for the BWPs of the plurality of CCs in the channel bandwidth.

In block 1508, the processor may perform operations including sending an indication of the one or more actual DC locations to the base station. As examples, the indication may be sent in a RRC message, a MAC-CE message, in UL control information, etc.

Figure 16:
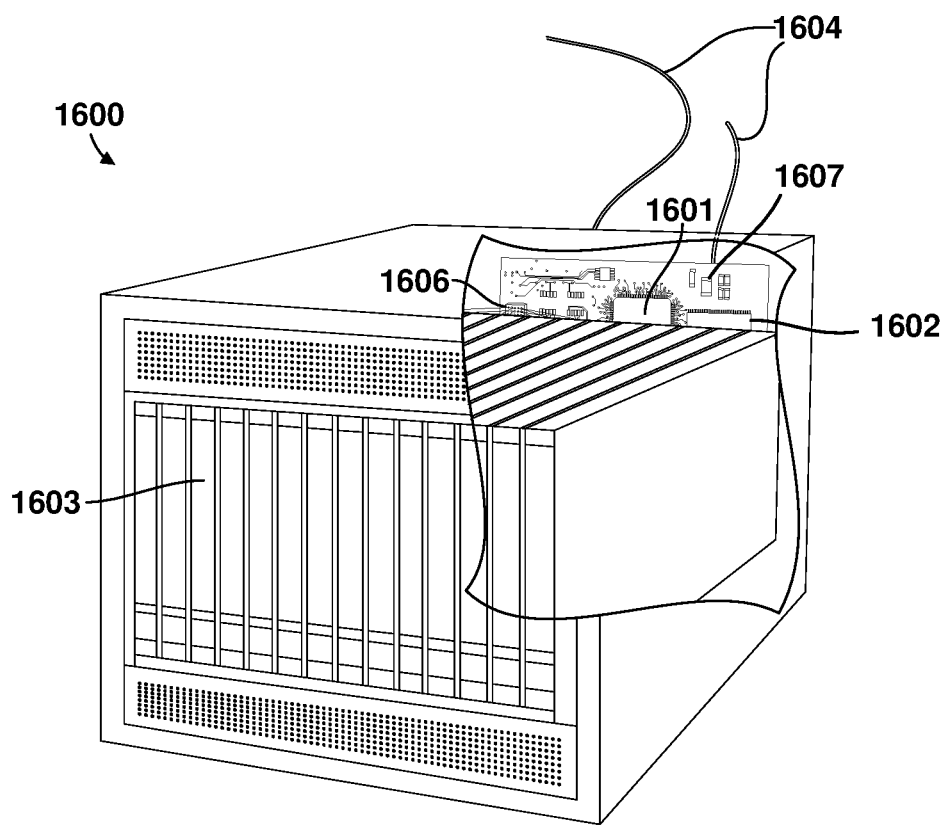
FIG. 16 is a component block diagram of an example network computing device.

FIG. 16 shows a component block diagram of an example network computing device 1600. In some aspects, the wireless network computing device 1600 may function as a network element of a communication network, such as a base station (e.g., base station 110a-110d, 350). The network computing device 1600 may include at least the components illustrated in FIG. 16. With reference to FIGS. 1-16, the network computing device 1600 may typically include a processor 1601 coupled to volatile memory 1602 and a large capacity nonvolatile memory, such as a disk drive 1603. The network computing device 1600 also may include a peripheral memory access device such as a floppy disc drive, compact disc (CD) or digital video disc (DVD) drive 1606 coupled to the processor 1601. The network computing device 1600 also may include network access ports 1604 (or interfaces) coupled to the processor 1601 for establishing data connections with a network, such as the Internet or a local area network coupled to other system computers and servers. The network computing device 1600 may include one or more antennas 1607 for sending and receiving electromagnetic radiation that may be connected to a wireless communication link. The network computing device 1600 may include additional access ports, such as USB, Firewire, Thunderbolt, and the like for coupling to peripherals, external memory, or other devices.

Figure 17:
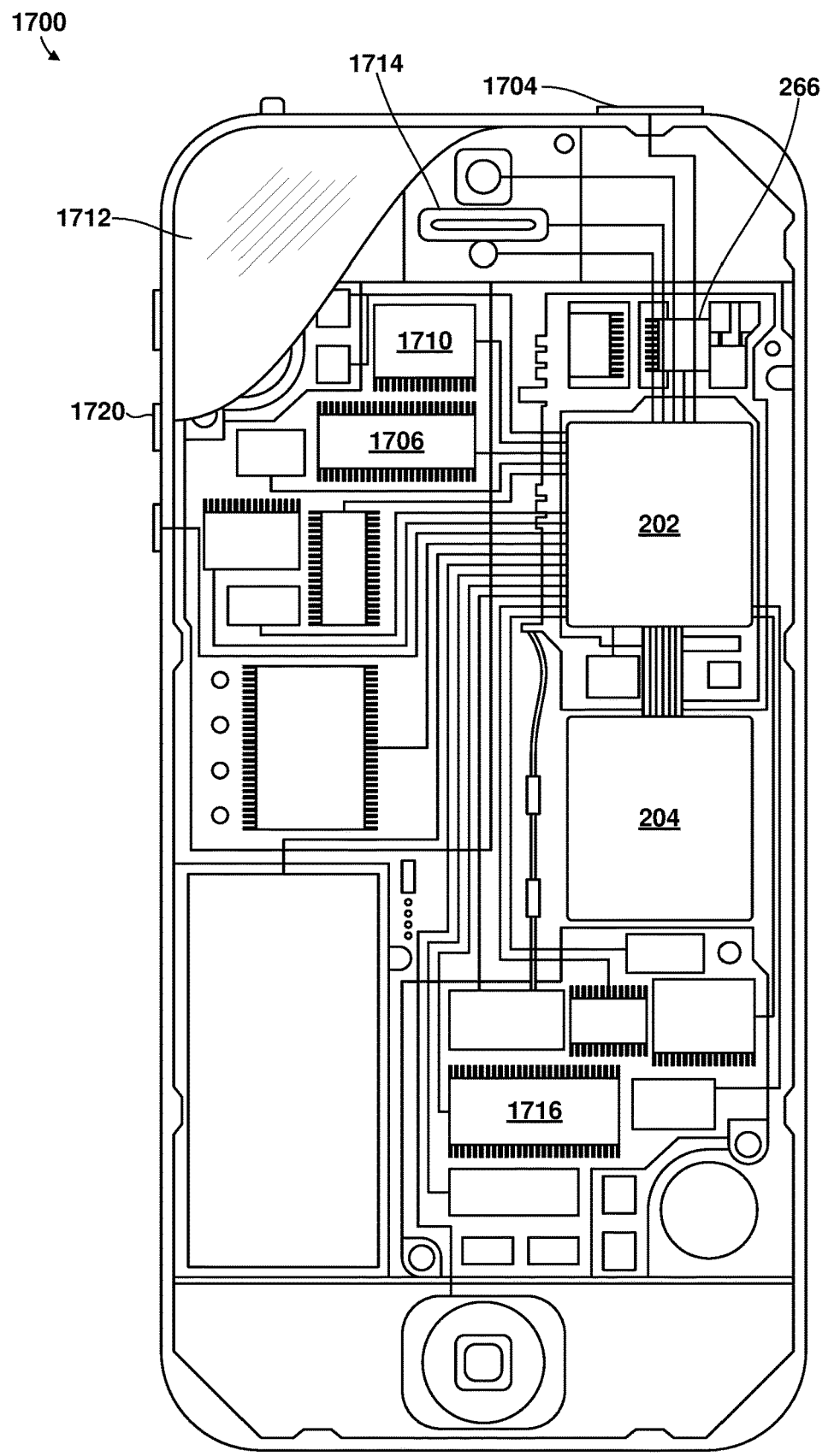
FIG. 17 is a component block diagram of an example wireless device.

FIG. 17 shows a component block diagram of an example wireless device. In some aspects, the wireless device may be implemented as a variety of wireless devices (for example, the wireless device 120, 120a-e, 200), an example of which is illustrated in FIG. 17 in the form of a smartphone 1700. With reference to FIGS. 1-17, the smartphone 1700 may include a first SOC 202 (for example, a SOC-CPU) coupled to a second SOC 204 (for example, a 5G capable SOC). The first and second SOCs 202, 204 may be coupled to internal memory 1706, 1716, a display 1712, and to a speaker 1714. Additionally, the smartphone 1700 may include an antenna 1704 for sending and receiving electromagnetic radiation that may be connected to a wireless data link or cellular telephone transceiver 266 coupled to one or more processors in the first or second SOCs 202, 204. Smartphones 1700 typically also include menu selection buttons or rocker switches 1720 for receiving user inputs.

A typical smartphone 1700 also includes a sound encoding/decoding (CODEC) circuit 1710, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1710 may include a digital signal processor (DSP) circuit (not shown separately).

The processors of the wireless network computing device 1600 and the wireless device 1700 may be any programmable microprocessor, microcomputer or multiple processor chip or chips that can be configured by software instructions (applications) to perform a variety of functions, including the functions of the various aspects described below. In some mobile devices, multiple processors may be provided, such as one processor within an SOC 204 dedicated to wireless communication functions and one processor within an SOC 202 dedicated to running other applications. Software applications may be stored in the memory before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various aspects. Such services and standards include, e.g., third generation partnership project (3GPP), LTE systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods 400, 500, 700, 800, 1000, 1100, 1400, and/or 1500 may be substituted for or combined with one or more operations of the methods 400, 500, 700, 800, 1000, 1100, 1400, and/or 1500.

Implementation examples are described in the following paragraphs. While some of the following implementation examples are described in terms of example methods, further example implementations may include: the example methods discussed in the following paragraphs implemented by a UE comprising a processor configured with processor-executable instructions to perform operations of the methods of the following implementation examples; the example methods discussed in the following paragraphs implemented by a UE comprising means for performing functions of the methods of the following implementation examples; and the example methods discussed in the following paragraphs may be implemented as a non-transitory processor-readable storage medium having stored thereon processor-executable instructions configured to cause a processor of a UE to perform the operations of the methods of the following implementation examples.

Example 1. A method for DC location reporting performed by a processor of a UE computing device in a wireless network (for example a UE computing device in a 5G NR network), including: receiving an indication of a configuration of a plurality of CCs in a channel bandwidth from a base station (for example a base station of a 5G NR network), in which each of the plurality of CCs includes one or more BWPs; receiving an indication of a subset of activation permutations for the BWPs of the plurality of CCs in the channel bandwidth from the base station, in which the subset of activation permutations is less than all possible activation permutations of the BWPs of the plurality of CCs in the channel bandwidth; determining one or more DC locations for the subset of activation permutations for the BWPs of the plurality of CCs in the channel bandwidth; and sending an indication of the one or more DC locations to the base station.

Example 2. The method of example 1, in which the indication of the subset of activation permutations for the BWPs of the plurality of CCs in the channel bandwidth is a list of permutations of BWPs for each CC of the plurality of CCs in the channel bandwidth that will be activated together.

Example 3. The method of example 1, in which the indication of the subset of activation permutations for the BWPs of the plurality of CCs in the channel bandwidth is a list of permutations of BWPs for each CC of the plurality of CCs in the channel bandwidth in an order of probability of actual activation.

Example 4. The method of example 1, in which the indication of the subset of activation permutations for the BWPs of the plurality of CCs in the channel bandwidth is a list of permutations of BWPs for each CC of the plurality of CCs in the channel bandwidth in an order of preference for activation (for example in order of preference for activation by a 5G NR network).

Example 5. The method of any of examples 1-4, further including: determining a subset of the plurality of CCs in the channel bandwidth in which one or more DC locations will be located, in which the subset of the plurality of CCs in the channel bandwidth is less than all of the plurality of CCs in the channel bandwidth; and sending an indication of the subset of the plurality of CCs in the channel bandwidth to the base station, in which determining the one or more DC locations for the subset of activation permutations for the BWPs of the plurality of CCs in the channel bandwidth includes determining the one or more DC locations in only the subset of the plurality of CCs in the channel bandwidth for the subset of activation permutations for the BWPs of the plurality of CCs in the channel bandwidth.

Example 6. The method of any of examples 1-5, further including: determining whether only edge CCs of the plurality of CCs in the channel bandwidth will impact DC location; and sending an indication to the base station that only edge CCs will impact DC location in response to determining that only edge CCs of the plurality of CCs in the channel bandwidth will impact DC location, in which the subset of activation permutations is less than all possible activation permutations of the BWPs of the plurality of CCs in the channel bandwidth and the subset of activation permutations is activation permutations of the BWPs of the edge CCs of the plurality of CCs in the channel bandwidth.

Example 7. A method for DC location reporting performed by a processor of a UE computing device in a wireless network (for example a UE computing device in a 5G NR network), including: receiving an indication of a configuration of a plurality of CCs in a channel bandwidth from a base station (for example a base station of a 5G NR network), in which each of the plurality of CCs includes one or more BWPs; determining whether only edge CCs of the plurality of CCs in the channel bandwidth will impact DC location; sending an indication to the base station that only edge CCs will impact DC location in response to determining that only edge CCs of the plurality of CCs in the channel bandwidth will impact DC location; receiving an indication of a subset of activation permutations for the BWPs of the plurality of CCs in the channel bandwidth from the base station, in which the subset of activation permutations is activation permutations of the BWPs of the edge CCs of the plurality of CCs in the channel bandwidth; determining one or more DC locations for the subset of activation permutations for the BWPs of the plurality of CCs in the channel bandwidth; and sending an indication of the one or more DC locations to the base station.

Example 8. The method of example 7, in which the indication of the subset of activation permutations for the BWPs of the plurality of CCs in the channel bandwidth is a list of permutations of BWPs for the edge CCs of the plurality of CCs in the channel bandwidth that will be activated together.

Example 9. A method for DC location reporting performed by a processor of a UE computing device (for example a UE computing device in a 5G NR network), including: receiving an indication of a configuration of a plurality of CCs in a channel bandwidth from a base station (for example a base station of a 5G NR network), in which each of the plurality of CCs includes one or more BWPs; determining a subset of the plurality of CCs in the channel bandwidth in which one or more DC locations will be located, in which the subset of the plurality of CCs in the channel bandwidth is less than all of the plurality of CCs in the channel bandwidth; sending an indication of the subset of the plurality of CCs in the channel bandwidth to the base station; determining the one or more DC locations in only the subset of the plurality of CCs in the channel bandwidth; and sending an indication of the one or more DC locations to the base station.

Example 10. A method for DC location reporting performed by a processor of a UE computing device in a wireless network (for example a UE computing device in a 5G NR network), including: receiving an indication of a configuration of a plurality of CCs in a channel bandwidth from a base station (for example a base station of a 5G NR network), in which each of the plurality of CCs includes one or more BWPs; determining a DC location per CC for the plurality of CCs in the channel bandwidth as a function of activation permutations for the BWPs of the plurality of CCs in the channel bandwidth; and sending an indication of the DC locations per CC to the base station.

Example 11. A method for DC location reporting performed by a processor of a UE computing device in a wireless network (for example a UE computing device in a 5G NR network), including: receiving an indication of a configuration of a plurality of CCs in a channel bandwidth from a base station (for example a base station of a 5G NR network), in which each of the plurality of CCs includes one or more BWPs; determining CCs in the channel bandwidth in which one or more DC locations may be located as a function of activation permutations for the BWPs of the plurality of CCs in the channel bandwidth; sending an indication of the CCs in the channel bandwidth in which one or more DC locations may be located to the base station; determining one or more actual DC locations in the channel bandwidth for only the CCs in the channel bandwidth in which one or more DC locations may be located; and sending an indication of the one or more actual DC locations to the base station.

Example 12. A method for DC location reporting performed by a processor of a UE computing device in a wireless network (for example a UE computing device in a 5G NR network), including: receiving an indication of a configuration of a plurality of CCs in a channel bandwidth from a base station (for example a base station of a 5G NR network), in which each of the plurality of CCs includes one or more BWPs; determining one CC in the channel bandwidth in which a DC location is located as a function of activation permutations for the BWPs of the plurality of CCs in the channel bandwidth; sending an indication of the one CC in the channel bandwidth in which the DC location is located to the base station; determining the actual DC location in the channel bandwidth for only the one CC in the channel bandwidth in which the DC location is located; and sending an indication of the actual DC location in the one CC to the base station.

Example 13. The method of any of examples 1-12, in which the plurality of CCs in the channel bandwidth is 2 to 16 CCs.

Example 14. The method of any of examples 1-13, in which the indication of the one or more DC locations is sent in a RRC message, a MAC-CE message, or in uplink control information.

Example 15. The method of any of examples 1-14, further including: sending an indication to the base station that the UE computing device supports compressed DC location reporting.

Example 16. The method of any of examples 1-15, in which the plurality of CCs in the channel bandwidth are a plurality of UL CCs.

Implementation examples are described in the following paragraphs. While some of the following implementation examples are described in terms of example methods, further example implementations may include: the example methods discussed in the following paragraphs implemented by a base station comprising a processor configured with processor-executable instructions to perform operations of the methods of the following implementation examples; the example methods discussed in the following paragraphs implemented by a base station comprising means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 17. A method for DC location reporting performed by a processor of a base station in a wireless network (for example a base station in a 5G NR network), including: receiving an indication from a UE computing device that the UE computing device supports compressed DC location reporting; configuring a plurality of CCs in a channel bandwidth for use by the UE computing device, in which each of the plurality of CCs includes one or more BWPs; sending an indication of the plurality of CCs in the channel bandwidth to the UE computing device; determining a subset of activation permutations for the BWPs of the plurality of CCs in the channel bandwidth, in which the subset of activation permutations is less than all possible activation permutations of the BWPs of the plurality of CCs in the channel bandwidth; and sending an indication of the subset of activation permutations for the BWPs of the plurality of CCs in the channel bandwidth to the UE computing device.

Example 18. The method of example 16, further including: receiving an indication from the UE computing device that only edge CCs of the plurality of CCs in the channel bandwidth will impact DC location, in which determining the subset of activation permutations for the BWPs of the plurality of CCs in the channel bandwidth includes determining the subset of activation permutations for the BWPs of the plurality of CCs in the channel bandwidth such that the subset of activation permutations is less than all possible activation permutations of the BWPs of the plurality of CCs in the channel bandwidth and the subset of activation permutations is activation permutations of the BWPs of the edge CCs of the plurality of CCs in the channel bandwidth.

Example 19. The method of any of examples 17-18, in which the indication of the subset of activation permutations for the BWPs of the plurality of CCs in the channel bandwidth is a list of permutations of BWPs for each CC of the plurality of CCs in the channel bandwidth that will be activated together.

Example 20. The method of any of examples 17-19, in which the indication of the subset of activation permutations for the BWPs of the plurality of CCs in the channel bandwidth is a list of permutations of BWPs for each CC of the plurality of four CCs in the channel bandwidth in an order of probability of actual activation or an order of preference for activation by a network.

Example 21. The method of any of examples 17-20, in which the plurality of CCs in the channel bandwidth is 2 to 16 CCs.

Example 22. The method of any of examples 17-21, further including: receiving an indication of one or more DC locations for the subset of activation permutations for the BWPs of the plurality of CCs in the channel bandwidth from the UE computing device.

Example 23. The method of example 22, in which the indication of the one or more DC locations is received in a RRC message, a MAC-CE message, or in uplink control information.

Example 24. The method of any of examples 17-23, in which the plurality of CCs in the channel bandwidth are a plurality of UL CCs.

Example 25. A UE computing device, including a processor configured with processor-executable instructions to perform the operations recited in any of examples 1-16.

Example 26. A wireless network base station, including a processor configured with processor-executable instructions to perform the operations recited in any of examples 17-24.

Example 27. A UE computing device, including means for performing functions of the methods recited in any of examples 1-16.

Example 28. A wireless network base station, including means for performing functions of the methods recited in any of examples 17-24.

Example 29. A non-transitory processor-readable storage medium having stored thereon processor-executable instructions configured to cause a processor of a UE computing device in a wireless network to perform the operations recited in any of examples 1-16.

Example 30. A non-transitory processor-readable storage medium having stored thereon processor-executable instructions configured to cause a processor of a base station in a wireless network to perform the operations recited in any of examples 17-24.

Example 31. A system, including: a UE computing device in a wireless network, including a processor configured with processor-executable instructions to perform the operations recited in any of examples 1-16; and a base station in the wireless network, including a processor configured with processor-executable instructions to perform the operations recited in any of examples 17-24.

Example 32. A system, including: a UE computing device in a wireless network, including means for performing functions of the methods recited in any of examples 1-16; and a base station in the wireless network, including means for performing functions of the methods recited in any of examples 17-24.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method for direct current (DC) location reporting performed by a User Equipment (UE) computing device, comprising:
   receiving an indication of a configuration of a plurality of component carriers (CCs) in a channel bandwidth from a base station of a wireless network, wherein each of the plurality of CCs includes one or more bandwidth parts (BWPs);
   receiving an indication of a subset of activation permutations for the BWPs of the plurality of CCs in the channel bandwidth from the base station, wherein the subset of activation permutations is less than all possible activation permutations of the BWPs of the plurality of CCs in the channel bandwidth;
   determining one or more DC locations for the subset of activation permutations for the BWPs of the plurality of CCs in the channel bandwidth; and
   sending an indication of the one or more DC locations to the base station.

2. The method of claim 1, wherein the indication of the subset of activation permutations for the BWPs of the plurality of CCs in the channel bandwidth is a list of permutations of BWPs for each CC of the plurality of CCs in the channel bandwidth that will be activated together.

3. The method of claim 1, wherein the indication of the subset of activation permutations for the BWPs of the plurality of CCs in the channel bandwidth is a list of permutations of BWPs for each CC of the plurality of CCs in the channel bandwidth in an order of probability of actual activation.

4. The method of claim 1, wherein the indication of the subset of activation permutations for the BWPs of the plurality of CCs in the channel bandwidth is a list of permutations of BWPs for each CC of the plurality of CCs in the channel bandwidth in an order of preference for activation.

5. The method of claim 1, further comprising:
   determining a subset of the plurality of CCs in the channel bandwidth in which one or more DC locations will be located, wherein the subset of the plurality of CCs in the channel bandwidth is less than all of the plurality of CCs in the channel bandwidth; and
   sending an indication of the subset of the plurality of CCs in the channel bandwidth to the base station,
   wherein determining the one or more DC locations for the subset of activation permutations for the BWPs of the plurality of CCs in the channel bandwidth comprises determining the one or more DC locations in only the subset of the plurality of CCs in the channel bandwidth for the subset of activation permutations for the BWPs of the plurality of CCs in the channel bandwidth.

6. The method of claim 1, further comprising:
   determining whether only edge CCs of the plurality of CCs in the channel bandwidth will impact DC location; and
   sending an indication to the base station that only edge CCs will impact DC location in response to determining that only edge CCs of the plurality of CCs in the channel bandwidth will impact DC location,
   wherein the subset of activation permutations is less than all possible activation permutations of the BWPs of the plurality of CCs in the channel bandwidth and the subset of activation permutations is activation permutations of the BWPs of the edge CCs of the plurality of CCs in the channel bandwidth.

7. The method of claim 1, wherein the plurality of CCs in the channel bandwidth is 2 to 16 CCs.

8. The method of claim 1, wherein the indication of the one or more DC locations is sent in a radio resource control (RRC) message, a medium access control (MAC) control element (MAC-CE) message, or in uplink control information.

9. The method of claim 1, further comprising:
sending an indication to the base station that the UE computing device supports compressed DC location reporting.

10. The method of claim 1, wherein the plurality of CCs in the channel bandwidth are a plurality of uplink (UL) CCs.

11. A User Equipment (UE), comprising:
a processor configured with processor-executable instructions to:
receive an indication of a configuration of a plurality of component carriers (CCs) in a channel bandwidth from a base station of a wireless network, wherein each of the plurality of CCs includes one or more bandwidth parts (BWPs);
receive an indication of a subset of activation permutations for the BWPs of the plurality of CCs in the channel bandwidth from the base station, wherein the subset of activation permutations is less than all possible activation permutations of the BWPs of the plurality of CCs in the channel bandwidth;
determine one or more direct current (DC) locations for the subset of activation permutations for the BWPs of the plurality of CCs in the channel bandwidth; and
send an indication of the one or more DC locations to the base station.

12. The UE of claim 11, wherein the indication of the subset of activation permutations for the BWPs of the plurality of CCs in the channel bandwidth is a list of permutations of BWPs for each CC of the plurality of CCs in the channel bandwidth that will be activated together.

13. The UE of claim 11, wherein the indication of the subset of activation permutations for the BWPs of the plurality of CCs in the channel bandwidth is a list of permutations of BWPs for each CC of the plurality of CCs in the channel bandwidth in an order of probability of actual activation.

14. The UE of claim 11, wherein the indication of the subset of activation permutations for the BWPs of the plurality of CCs in the channel bandwidth is a list of permutations of BWPs for each CC of the plurality of CCs in the channel bandwidth in an order of preference for activation.

15. The UE of claim 11, wherein the processor is further configured with processor-executable instructions to:
determine a subset of the plurality of CCs in the channel bandwidth in which one or more DC locations will be located, wherein the subset of the plurality of CCs in the channel bandwidth is less than all of the plurality of CCs in the channel bandwidth;
send an indication of the subset of the plurality of CCs in the channel bandwidth to the base station; and
determine the one or more DC locations for the subset of activation permutations for the BWPs of the plurality of CCs in the channel bandwidth by determining the one or more DC locations in only the subset of the plurality of CCs in the channel bandwidth for the subset of activation permutations for the BWPs of the plurality of CCs in the channel bandwidth.

16. The UE of claim 11, wherein:
the processor is further configured with processor-executable instructions to:
determine whether only edge CCs of the plurality of CCs in the channel bandwidth will impact DC location; and
send an indication to the base station that only edge CCs will impact DC location in response to determining that only edge CCs of the plurality of CCs in the channel bandwidth will impact DC location; and
the subset of activation permutations is less than all possible activation permutations of the BWPs of the plurality of CCs in the channel bandwidth and the subset of activation permutations is activation permutations of the BWPs of the edge CCs of the plurality of CCs in the channel bandwidth.

17. The UE of claim 11, wherein the plurality of CCs in the channel bandwidth is 2 to 16 CCs.

18. The UE claim 11, wherein the indication of the one or more DC locations is sent in a radio resource control (RRC) message, a medium access control (MAC) control element (MAC-CE) message, or in uplink control information.

19. The UE of claim 11, the processor is further configured with processor-executable instructions to:
send an indication to the base station that the UE supports compressed DC location reporting.

20. The UE of claim 11, wherein the plurality of CCs in the channel bandwidth are a plurality of uplink (UL) CCs.

21. A User Equipment (UE), comprising:
means for receiving an indication of a configuration of a plurality of component carriers (CCs) in a channel bandwidth from a base station of a wireless network, wherein each of the plurality of CCs includes one or more bandwidth parts (BWPs);
means for receiving an indication of a subset of activation permutations for the BWPs of the plurality of CCs in the channel bandwidth from the base station, wherein the subset of activation permutations is less than all possible activation permutations of the BWPs of the plurality of CCs in the channel bandwidth;
means for determining one or more direct current (DC) locations for the subset of activation permutations for the BWPs of the plurality of CCs in the channel bandwidth; and
means for sending an indication of the one or more DC locations to the base station.

22. The UE of claim 21, wherein the indication of the subset of activation permutations for the BWPs of the plurality of CCs in the channel bandwidth is a list of permutations of BWPs for each CC of the plurality of CCs in the channel bandwidth that will be activated together, a list of permutations of BWPs for each CC of the plurality of CCs in the channel bandwidth in an order of probability of actual activation, or a list of permutations of BWPs for each CC of the plurality of CCs in the channel bandwidth in an order of preference for activation.

23. The UE of claim 21, further comprising:
means for determining a subset of the plurality of CCs in the channel bandwidth in which one or more DC locations will be located, wherein the subset of the plurality of CCs in the channel bandwidth is less than all of the plurality of CCs in the channel bandwidth; and
means for sending an indication of the subset of the plurality of CCs in the channel bandwidth to the base station,
wherein means for determining the one or more DC locations for the subset of activation permutations for the BWPs of the plurality of CCs in the channel bandwidth comprises means for determining the one or more DC locations in only the subset of the plurality of CCs in the channel bandwidth for the subset of activation permutations for the BWPs of the plurality of CCs in the channel bandwidth.

24. The UE of claim 21, further comprising:
means for determining whether only edge CCs of the plurality of CCs in the channel bandwidth will impact DC location; and
means for sending an indication to the base station that only edge CCs will impact DC location in response to determining that only edge CCs of the plurality of CCs in the channel bandwidth will impact DC location,
wherein the subset of activation permutations is less than all possible activation permutations of the BWPs of the plurality of CCs in the channel bandwidth and the subset of activation permutations is activation permutations of the BWPs of the edge CCs of the plurality of CCs in the channel bandwidth.

25. The UE of claim 21, wherein the plurality of CCs in the channel bandwidth is 2 to 16 CCs.

26. The UE of claim 21, wherein the indication of the one or more DC locations is sent in a radio resource control (RRC) message, a medium access control (MAC) control element (MAC-CE) message, or in uplink control information.

27. The UE of claim 21, further comprising:
means for sending an indication to the base station that the UE supports compressed DC location reporting.

28. The UE of claim 21, wherein the plurality of CCs in the channel bandwidth are a plurality of uplink (UL) CCs.

29. A non-transitory processor-readable storage medium having stored thereon processor-executable instructions configured to cause a processor of a User Equipment (UE) computing device to perform operations comprising:
receiving an indication of a configuration of a plurality of component carriers (CCs) in a channel bandwidth from a base station of a wireless network, wherein each of the plurality of CCs includes one or more bandwidth parts (BWPs);
receiving an indication of a subset of activation permutations for the BWPs of the plurality of CCs in the channel bandwidth from the base station, wherein the subset of activation permutations is less than all possible activation permutations of the BWPs of the plurality of CCs in the channel bandwidth;
determining one or more direct current (DC) locations for the subset of activation permutations for the BWPs of the plurality of CCs in the channel bandwidth; and
sending an indication of the one or more DC locations to the base station.

* * * * *